US006963938B2

(12) United States Patent
Suzuki et al.

(10) Patent No.: US 6,963,938 B2
(45) Date of Patent: Nov. 8, 2005

(54) INFORMATION PROCESSING APPARATUS AND METHOD THEREFOR

(75) Inventors: Naohisa Suzuki, Kanagawa (JP); Atsushi Nakamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 550 days.

(21) Appl. No.: 09/939,806

(22) Filed: Aug. 28, 2001

(65) Prior Publication Data

US 2002/0026550 A1 Feb. 28, 2002

(30) Foreign Application Priority Data

Aug. 29, 2000 (JP) ....................................... 2000-259713

(51) Int. Cl.[7] ................................................ G06F 13/00

(52) U.S. Cl. ........................ 710/104; 710/100; 710/305; 710/306; 710/313; 710/314; 710/315

(58) Field of Search ................................ 710/100, 104, 710/305–306, 313–315

(56) References Cited

U.S. PATENT DOCUMENTS

| | | | | | |
|---|---|---|---|---|---|
| 5,815,678 | A | * | 9/1998 | Hoffman et al. | 710/305 |
| 5,968,152 | A | * | 10/1999 | Staats | 710/104 |
| 5,991,842 | A | * | 11/1999 | Takayama | 710/105 |
| 6,141,767 | A | * | 10/2000 | Hu et al. | 714/1 |
| 6,237,049 | B1 | * | 5/2001 | Ludtke | 710/8 |
| 6,275,889 | B1 | * | 8/2001 | Saito | 710/313 |
| 6,351,818 | B1 | * | 2/2002 | Murai | 713/300 |
| 6,446,155 | B1 | * | 9/2002 | Maggi et al. | 710/313 |
| 6,477,589 | B1 | * | 11/2002 | Suzuki et al. | 710/18 |
| 6,502,158 | B1 | * | 12/2002 | James et al. | 710/311 |
| 6,512,767 | B1 | * | 1/2003 | Takeda et al. | 370/389 |
| 6,549,951 | B1 | * | 4/2003 | Hui et al. | 709/250 |
| 6,553,432 | B1 | * | 4/2003 | Critz et al. | 710/10 |
| 6,640,312 | B1 | * | 10/2003 | Thomson et al. | 714/5 |
| 6,643,714 | B1 | * | 11/2003 | Chrysanthakopoulos | 710/8 |
| 6,671,768 | B1 | * | 12/2003 | Brown | 711/102 |
| 6,691,096 | B1 | * | 2/2004 | Staats | 707/1 |
| 6,769,077 | B2 | * | 7/2004 | Vachon et al. | 714/43 |
| 6,813,663 | B1 | * | 11/2004 | Brown | 710/704 |
| 2002/0042855 | A1 | * | 4/2002 | Takayama et al. | 710/105 |
| 2003/0009537 | A1 | * | 1/2003 | Wang | 709/219 |
| 2003/0140135 | A1 | * | 7/2003 | Okuyama et al. | 709/223 |

OTHER PUBLICATIONS

Paskins, Adrian, "The IEEE 1394 Bus," May 12, 1997, IEEE Half–Day Colloquium on New High Capacity Digital Media and The Applications, Digest No. 1997/114, p. 4/1–4/6.*

Diamond, Stephen L., "IEEE 1394: Status and Growth Path," Jun. 1996, IEEE Micro Standards, vol. 16, Issue 3, p. 75–78.*

"IEEE Standard for a Higher Performance Serial Bus", IEEE 1394–1995, IEEE Computer Society.

* cited by examiner

*Primary Examiner*—Mark H. Rinehart
*Assistant Examiner*—Donna K. Mason
(74) *Attorney, Agent, or Firm*—Fitzpatrick, Cella, Harper & Scinto

(57) ABSTRACT

If a block read cannot be used to read out from a configuration ROM information, the number of times of issue of a quadlet read request increases. This degrades the processing efficiently of a device that issues the request. In addition, the bus occupation ratio of a 1394 serial bus by the request becomes high, and the speed of processing through the 1394 serial bus decreases. To solve these problems, information stored in the configuration ROM area of a device is read out, and it is determined on the basis of the readout information that configuration information identical to the configuration ROM information is stored in an address area (block readable area) different from the configuration ROM area, the offset is changed, and the configuration information is read out from the address area different from the configuration ROM area.

16 Claims, 34 Drawing Sheets

FIG. 6

| CSR CORE REGISTER | | |
|---|---|---|
| OFFSET (HEXADECIMAL) | REGISTER NAME | FUNCTION |
| 000 | STATE_CLEAR | STATE AND CONTROL INFORMATION |
| 004 | STATE_SET | INFORMATION REPRESENTING STATE_CLEAR WRITE |
| 008 | NODE_IDS | BUS ID + NODE ID |
| 00C | RESET_START | BUS IS RESET BY WRITE IN THIS AREA |
| 010~014 | INDIRECT_ADDRESS, INDIRECT_DATA | REGISTER FOR ACCESSING FOR LARGER THAN 1K |
| 018~01C | SPLIT_TIMEOUT | VALUE OF TIMER FOR DETECTING TIMEOUT OF SPLIT TRANSACTION |
| 020~02C | ARGUMENT, TEST_START, TEST_STATUS | REGISTER FOR DIAGNOSIS |
| 030~04C | UNITS_BASE, UNITS_BOUND, MEMORY_BASE, MEMORY_BOUND | NOT PREPARED FOR IEEE1394 |
| 050~054 | INTERRUPT_TARGET, INTERRUPT_MASK | INTERRUPT NOTIFICATION REGISTER |
| 058~07C | CLOCK_VALUE, CLOCK_TICK_PERIOD, CLOCK_STOROBE_ARRIVED, CLOCK_INFO | NOT PREPARED FOR IEEE1394 |
| 080~0FC | MESSAGE_REQUEST, MESSAGE_RESPONSE | MESSAGE NOTIFICATION REGISTER |
| 100~17C | | RESERVATION |
| 180~1FC | ERROR_LOG_BUFFER | RESERVATION FOR IEEE1394 |

FIG. 7

| SERIAL BUS REGISTER | | |
|---|---|---|
| OFFSET (HEXADECIMAL) | REGISTER NAME | FUNCTION |
| 200 | CYCLE_TIME | COUNTER FOR ISOCHRONOUS TRANSFER |
| 204 | BUS_TIME | REGISTER FOR TIME SYNCHRONIZATION |
| 208 | POWER_FAIL_IMMINENT | REGISTER RELATED TO POWER SUPPLY |
| 20C | POWER_SOURCE | |
| 210 | BUSY_TIMEOUT | CONTROLLING RETRY OF TRANSACTION LAYER |
| 214 ~ 218 | | RESERVATION |
| 21C | BUS_MANAGER_ID | NODE ID OF BUS MANAGER |
| 220 | BANDWIDTH_AVAILABLE | MANAGING BAND FOR ISOCHRONOUS TRANSFER |
| 224 ~ 228 | CHANNELS_AVAILABLE | MANAGING CHANNEL NUMBER OF ISOCHRONOUS TRANSFER |
| 22C | MAINT_CONTROL | REGISTER FOR DIAGNOSIS |
| 230 | MAINT_UTILITY | |
| 234 ~ 3FC | | RESERVATION |

FIG. 8

| 8bits | 24bits |
|---|---|
| 01 | VENDOR ID |

CONFIGURATION ROM WITH MINIMAL FORMAT

FIG. 10

| SERIAL BUS DEVICE REGISTER | | |
|---|---|---|
| OFFSET (HEXADECIMAL) | REGISTER NAME | FUNCTION |
| 800 ~ FFC | | RESERVATION |
| 1000 ~ 13FC | TOPOLOGY_MAP | SERIAL BUS CONFIGURETION INFORMATION |
| 1400 ~ 1FFC | | RESERVATION |
| 2000 ~ 2FFC | SPEED_MAP | SERIAL BUS TRANSFER RATE INFORMATION |
| 3000 ~ FFFC | | RESERVATION |

(CLOCK IS OBTAINED BY PERFORMING EXCLUSIVE OR DATA AND STROBE)

FIG. 24

| ABBREVIATION | NAME | CONTENTS |
|---|---|---|
| destination_ID | destination identifier | INDICATING ID OF DESTINATION NODE (ONLY FOR ASYNSHRONOUS) |
| tl | transaction label | LABEL THAT INDICATES SERIES OF TRANSACTION (ONLY FOR ASYNSHRONOUS) |
| rt | retry code | CODE THAT INDICATES RE-SEND STARUS (ONLY FOR ASYNCHRONOUS) |
| tcode | transaction code | CODE THAT INDICATES TYPE OF PACKET (ONLY FOR ASYNCHRONOUS) |
| prt | priority | PRIORITY ORDER (ONLY FOR ASYNCHRONOUS) |
| source_ID | source identifier | INDICATION ID OF SOURCE NODE (ONLY FOR ASYNCHRONOUS) |
| destination offset | destination memory address | MEMORY ADDRESS OF DESTINATION NODE (ONLY FOR ASYNCHRONOUS) |
| rcode | response code | RESPONSE STATUS (ONLY FOR ASYNCHRONOUS) |
| quadlet_data | quadlet (4bytes) data | 4-BYTE LONG DATA (ONLY FOR ASYNCHRONOUS) |
| data_length | length of data | LENGTH OF data_field (EXCEPT pad bytes) |
| extended tcode | extended transaction code | EXTENDED TRANSACTION CODE (ONLY FOR ASYNCHRONOUS) |
| channel | isochronous identifier | IDENTIFYING ISOCHRONOUS PACKET |
| sy | synchronization code | USED TO SYNCHRONIZE VIDEO AND AUDIO (ONLY FOR ISOCHRONOUS) |
| cycle_time_ data | contents of the CYCLE_TIME register | VALUE OF CYCLE TIMER REGISTER OF CYCLE MASTER NODE (ONLY FOR CYCLE PACKET) |
| data_field | data +pad bytes | STORING DATA (ISOCHRONOUS AND ASYNCHRONOUS) |
| header_CRC | CRC for header field | CRC FOR HEADER FIELD |
| data_CRC | CRC for data field | CRC FOR DATA FIELD |
| tag | tag label | LABEL INDICATING FORMAT OF ISOCHRONOUS PACKET |

FIG. 32

| | |
|---|---|
| $1_{16}$ | Vendor_ID (rid) |
| $38_{16}$(Key) | ROM image offset |
| Vendor Dependent Information | |

INFORMATION PROCESSING APPARATUS AND METHOD THEREFOR

FIELD OF THE INVENTION

The present invention relates to an information processing apparatus and a method therefor and, more particularly, to an information processing apparatus connected to a serial bus such as an IEEE 1394 and a method therefor.

BACKGROUND OF THE INVENTION

A serial bus interface such as an IEEE 1394 can connect a plurality of devices such as a digital video camera (DV), digital still camera (DC), host computer, scanner, printer, and digital video tape recorder all together, unlike an interface such as a centronics which connects a host and device in a one-to-one correspondence. Hence, a serial bus interface may be applied to a data communication network system in which a plurality of devices are connected.

Various kinds of devices are connected to such a network. Many unspecified devices available from different manufacturers may be connected to a network.

For a serial bus interface compatible to or complying with the IEEE 1394 (to be simply referred to as a "1394 interface" hereinafter), the IEEE 1212 and IEEE 1394 standards define that each device should have a configuration ROM in a predetermined address space as a means for identifying the device on a network and obtaining information related to the device.

The configuration ROM stores a node unique ID as an ID unique to each device. A node unique ID is formed from 64 bits. The upper 24 bits form a device manufacturer ID assigned by the IEEE (The Institute of Electrical and Electronics Engineers, Inc.) and the lower 48 bits can be freely defined by each manufacturer. A specific node unique ID is set for one device independently of the manufacturer and model of the device.

A bus info block representing the function and performance supported by the device on the 1394 interface, a vendor directory representing information related to the manufacturer, an instance directory representing information related to the function of the device itself, such as a printer or scanner, and a unit directory representing protocol software information supported to control each function on the 1394 interface are also recorded in the configuration ROM in accordance with a predetermined format and standard.

By reading out and analyzing pieces of information stored in the configuration ROM of a device connected to an IEEE 1394 serial bus (to be simply referred to as a "1394 serial bus" hereinafter), a partner device with which a certain device wants to communicate can be specified on a network (to be referred to as a "1394 network" hereinafter) in which a plurality of devices are connected through the 1394 serial bus. Also in specifying a device again after bus reset, a desired device can be specified by reading out information from the configuration ROM of each device connected to the 1394 network.

As described above, in data communication between devices connected to a 1394 network, a read of information from the configuration ROM is generally and frequently done.

For some devices, it is difficult to efficiently read out information from the configuration ROM. More specifically, some devices are not compatible with a block read, i.e., batch read operation in the IEEE 1394 for a 1-kbyte configuration ROM area defined by the IEEE 1212. To read out information from the configuration ROM of such a device, a quadlet read as a minimum unit of read operation in the IEEE 1394 must be repeated.

As a device becomes complex with multiple functions, the number of pieces of information described in the configuration ROM and their amounts increase and therefore the number of pieces of information to be read out also tends to increase. If a block read cannot be used to read out pieces of information from the configuration ROM, the number of times of issue of a quadlet read request increases. This degrades the processing efficiently of the device that issues such request. In addition, the bus occupation ratio of the 1394 serial bus by the request becomes high, and the speed of processing through the 1394 serial bus decreases.

Furthermore, a configuration ROM with a minimal format defined by the IEEE 1212 cannot provide sufficient information to another device.

SUMMARY OF THE INVENTION

The present invention has been made to solve the above-described problems independently or altogether, and has as its object to enable an efficient read of configuration ROM information.

In order to achieve the above object, a preferred aspect of the present invention discloses an information processing apparatus comprising an interface arranged to connect to a serial bus compatible to or complying with the IEEE 1394 standard; and a memory arranged to store, in a predetermined address area, configuration ROM information complying with the IEEE 1212 standard and to store configuration information identical to the configuration ROM information in an address area different from the predetermined address area.

It is another object of the present invention to enable providing sufficient information by reading out configuration ROM information.

In order to achieve the above object, another preferred aspect of the present invention discloses an information processing apparatus comprising an interface arranged to connect to a serial bus compatible to or complying with the IEEE 1394 standard; and a memory arranged to store, in a predetermined address area, configuration ROM information with a minimal format complying with the IEEE 1212 standard and to store configuration information corresponding to configuration ROM information with a general format complying with the IEEE 1212 standard in an address area different from the predetermined address area.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6 is a view showing the addresses and functions of pieces of information stored in a CSR core register;

FIG. 7 is a view showing the addresses and functions of pieces of information stored in a serial bus register;

FIG. 8 is a view showing a configuration ROM with a minimal format;

FIG. 10 is a view showing the addresses and functions of pieces of information stored in a serial bus unit register in a unit space;

FIG. 24 is a view for explaining details of the packet fields in the respective packet formats;

FIG. 32 is a view showing the configuration ROM of the digital camera according to the embodiment;

DETAILED DESCRIPTION OF THE PREFERRED EMBODIMENT

A preferred embodiment of the present invention will be described below in detail with reference to the accompanying drawings.

In the embodiment to be described below, an example using, e.g., an IEEE 1394-1995 (high performance serial bus, to be simply referred to as a "1394 serial bus" hereinafter) as a digital interface for connecting devices will be described. First, an outline of a 1394 serial bus will be described. The IEEE 1394-1995 standard is described in detail in "IEEE Standard for a High Performance Serial Bus" published from the IEEE on Aug. 30, 1996.

Outline of 1394 Serial Bus

The advent of home digital video tape recorders and digital video discs (DVD) generates a necessity for real-time transfer of data such as video data or audio data (to be referred to as "AV data" hereinafter) containing information in a large amount. To transfer AV data to a personal computer (PC) or another digital device in real time, an interface having a high-speed data transfer capability is required. An interface developed from that viewpoint is a 1394 serial bus.

Figure 1:
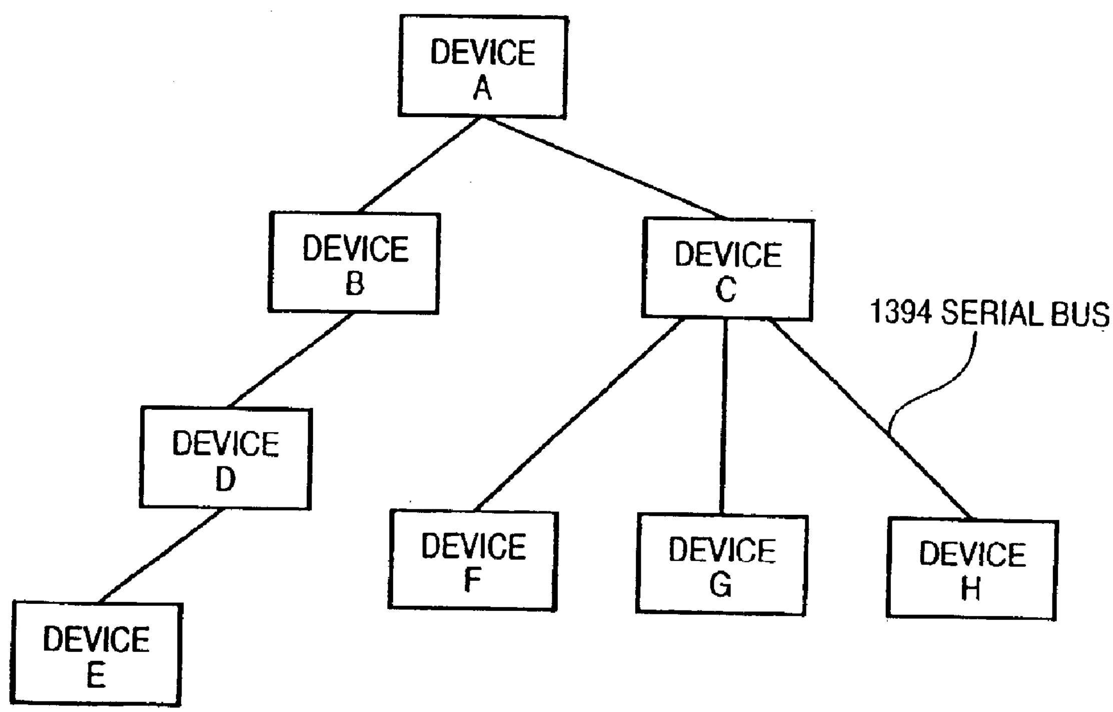
FIG. 1 is a view showing a network system constructed using 1394 serial buses.

FIG. 1 is a view showing a network system built using 1394 serial buses.

Each of devices A to H at nodes of the network system shown in FIG. 1 has a digital interface compatible to or complying with the IEEE 1394 standard. The 1394 network forms a bus network capable of serial data communication.

The devices A and B, A and C, B and D, D and E, C and F, C and G, and C and H are connected through twisted pair cables for 1394 serial buses. Examples of the devices A to H are host computer apparatuses such as personal computers, and computer peripheral devices. The computer peripheral devices include a digital video cassette recorder, a DVD (Digital Video Disc) player, a digital still camera, a hard disk or a storage unit using a medium such as an optical disk, a CRT or LCD monitor, a tuner, an image scanner, a film scanner, a printer, a MODEM, a terminal adapter (TA), and the like. Note that the printer can use any printing scheme such as electrophotography, inkjet, ink fusing or sublimation thermal transfer, or heat-sensitive printing.

Since the devices can be connected using both a daisy chain scheme and a node branch scheme, the degree of freedom of connection is high. Each device has an ID. The devices mutually recognize each other's IDs, thereby constructing one network in the range connected through the 1394 serial buses. For example, only by connecting devices by daisy chain using single 1394 serial bus cables, the respective devices can serve as relays, and therefore, one network can be constructed.

A 1394 serial bus is compatible with the plug and play function and has a function of automatically recognizing a device and its connection state only by connecting the 1394 serial bus cable to the device. In the system shown in FIG. 1, when a device is removed from the network or newly added to the network, the bus is automatically reset (the configuration information of the network is reset) and a new network is reconstructed. With this function, the configuration of the network can always be set and recognized. The bus reset is also executed when an existing device is powered on/off.

The 1394 serial bus has a function of relaying data transferred from another device. With this function, all devices on the 1394 network can grasp the operation situation of the bus.

The data transfer rate of the 1394 serial bus is defined as 100/200/400 Mbps. A device having a higher transfer rate supports a lower transfer rate, thereby maintaining compatibility. Data transfer modes include an asynchronous transfer mode (ATM) for transferring asynchronous data such as a control signal and an isochronous transfer mode for transferring synchronous data such as real-time AV data. Asynchronous data and synchronous data are mixed and transferred in each cycle following the transfer of a cycle start packet (CSP) representing the start of a cycle with priority over synchronous data transfer. The transfer band of the isochronous transfer mode is guaranteed in each communication cycle.

The asynchronous transfer mode is effectively used to transfer data that requires to be asynchronously transferred as needed, i.e., a control signal or file data. The isochronous transfer mode is effectively used to transfer data that requires to be continuously transferred in a predetermined amount at a predetermined data rate, i.e., video data or audio data.

[Architecture]

Figure 2:
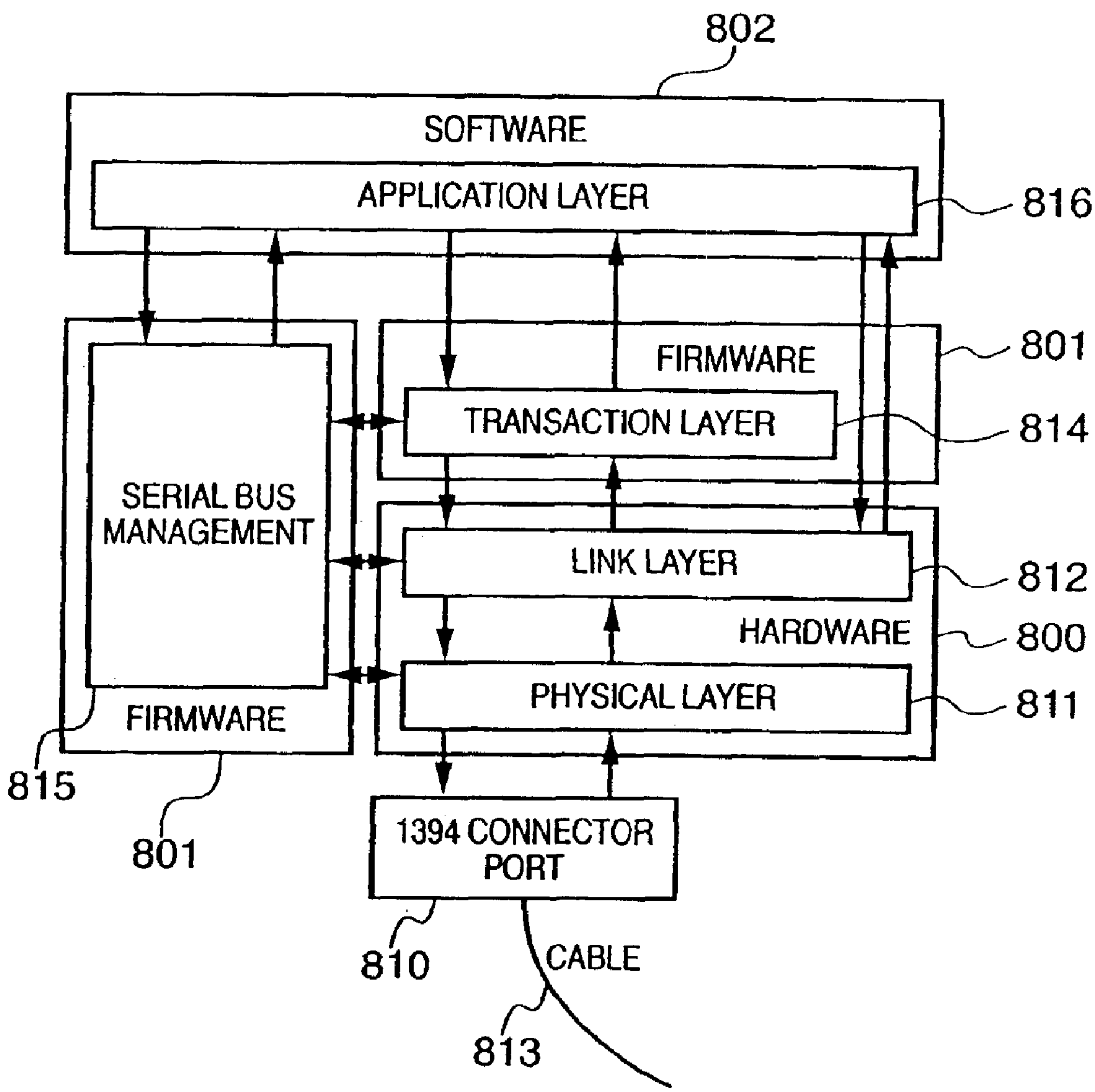
FIG. 2 is a block diagram showing the architecture of a 1394 interface.

FIG. 2 is a block diagram showing the architecture of a 1394 interface that has a layer structure. As shown in FIG. 2, a connector at the distal end of a 1394 serial bus cable 813 is connected to a connector port 810. A physical layer 811 and link layer 812 which are formed from a hardware section 800 are present on the upper side of the connector port 810. The hardware section 800 is formed from an interface chip. The physical layer 811 executes control related to encoding or connection. The link layer 812 controls packet transfer or cycle time.

A transaction layer 814 of a firmware section 801 manages data to be transferred and provides read, write, and lock transactions. A serial bus management 815 of the firmware section 801 manages the connection situation or ID of each device connected to the 1394 serial bus and manages the configuration of the 1394 network. The hardware and firmware make up the actual architecture of the 1394 serial bus.

An application layer 816 of a software section 802 changes depending on software to be used. How to transfer data on the interface is defined by a printer or a protocol such as an Audio/Video Control (AV/C) protocol.

Link Layer

Figure 3:
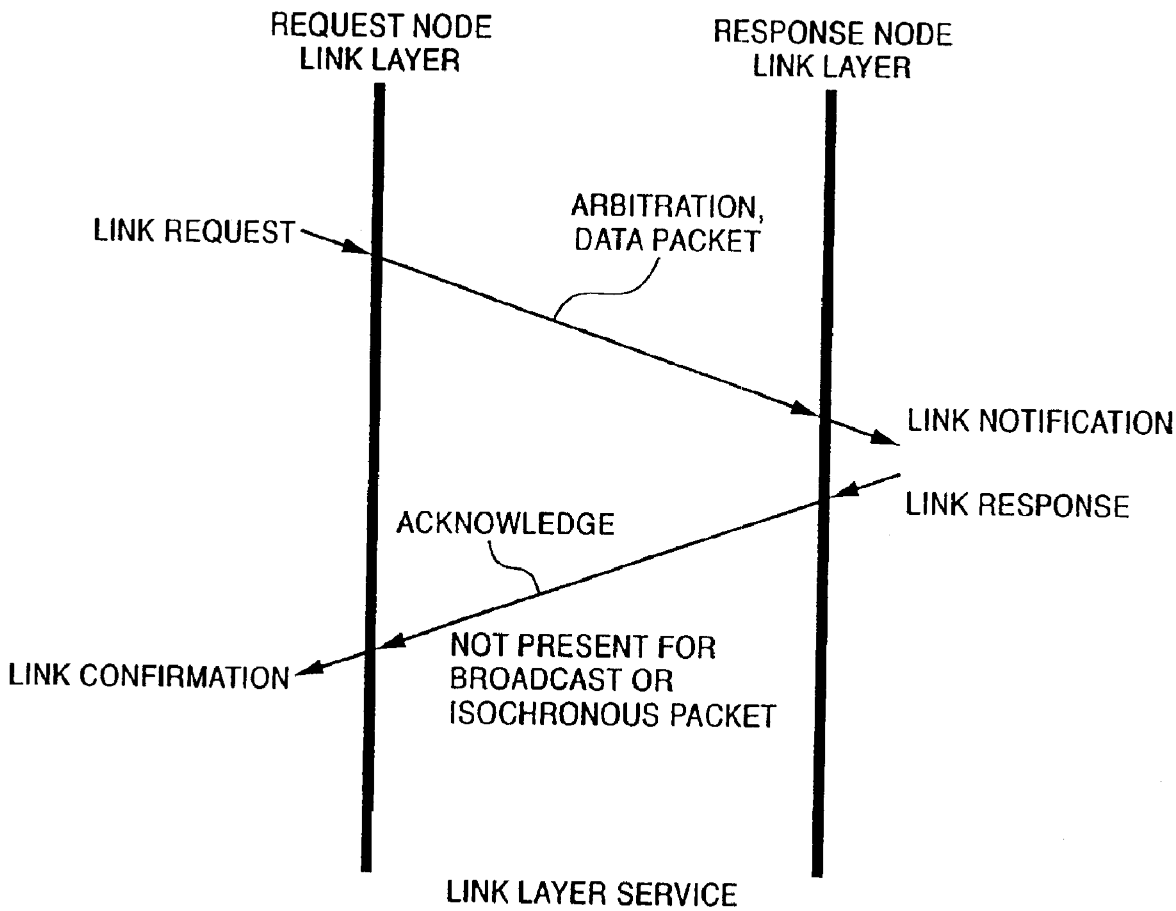
FIG. 3 is a view showing a service provided by a link layer.

FIG. 3 is a view showing a service provided by the link layer 812. The link layer 812 provides the following four services.

(1) Link request that requests response node to transfer predetermined packet (LK_DATA.request)
(2) Link notification that notifies response node of reception of predetermined packet (LK_DATA.indication)
(3) Link response representing reception of acknowledge from response node (LK_DATA.response)
(4) Link confirmation that confirms acknowledge from request node (LK_DATA.confirmation)

The link response (LK_DATA.response) is not present in broadcast communication or isochronous packet transfer. The link layer 812 realizes the two transfer schemes, the asynchronous transfer mode and isochronous transfer mode, on the basis of the above-described services.

Transaction Layer

Figure 4:
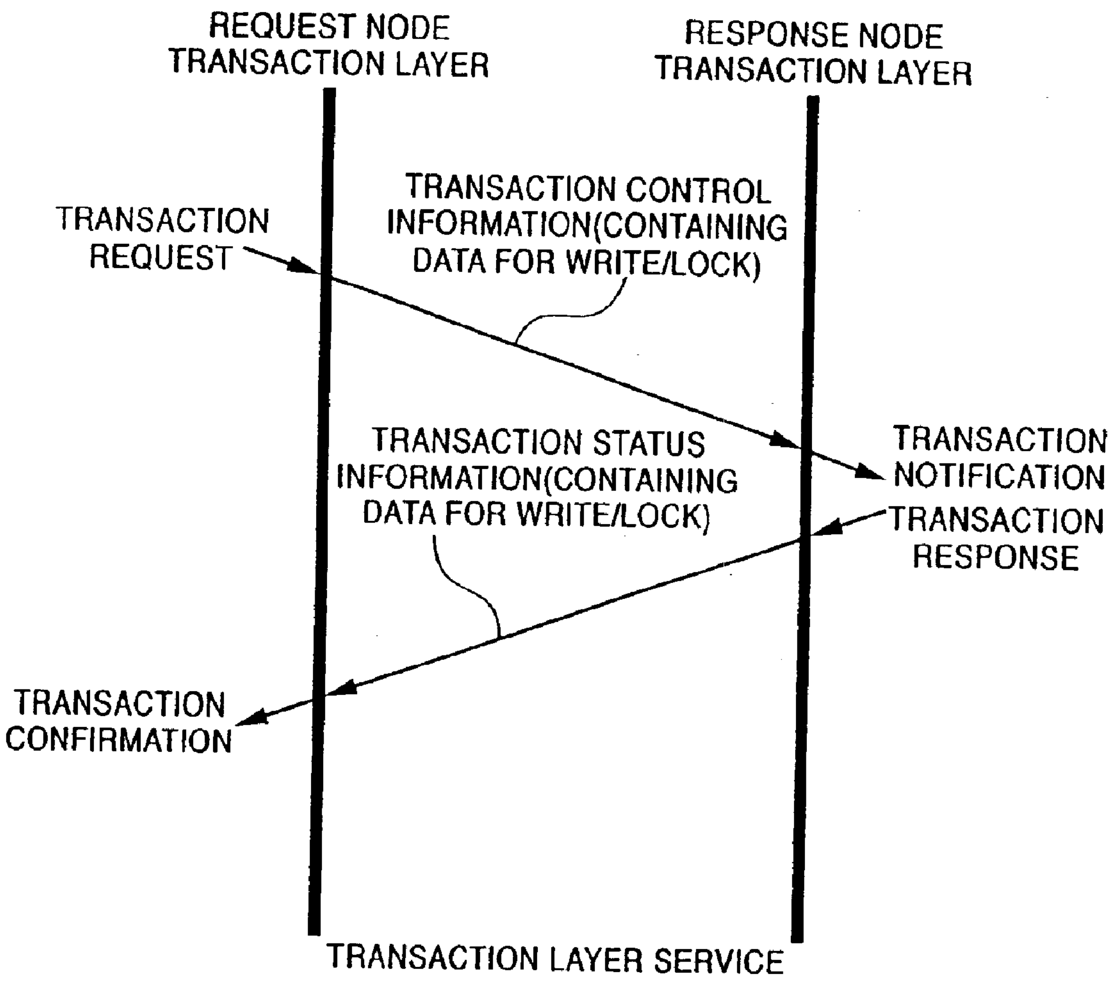
FIG. 4 is a view showing a service provided by a transaction layer.

FIG. 4 is a view showing a service provided by the transaction layer 814. The transaction layer 814 provides the following four services.

(1) Transaction request that requests response node to perform predetermined transaction (TR_DATA.request)
(2) Transaction notification that notifies response node of reception of predetermined transaction request (TR_DATA.indication)
(3) Transaction response representing reception of status information (including data for a write or lock) from response node (TR_DATA.response)
(4) Transaction confirmation that confirms status information from request node (TR_DATA.confirmation)

The transaction layer 814 manages asynchronous transfer on the basis of the above-described services and realizes three transactions, i.e., read, write, and lock transactions.

(1) Read transaction: A request node reads information stored at a specific address of a response node.
(2) Write transaction: A request node writes predetermined information to a specific address of a response node.
(3) Lock transaction: A request node transfers reference data and update data to a response node. The response node compares the received reference data with information at a specific address and updates the information at the specific address to the update data in accordance with the comparison result.

Serial Bus Management

The serial bus management 815 specifically provides the following three functions, i.e., node control, isochronous resource manager (IRM), and bus manager.

(1) Node control: The node control manages each of the above-described layers and asynchronous transfer with another node.
(2) IRM: The IRM manages isochronous transfer with another node. More specifically, the IRM manages pieces of information necessary for assignment of a transfer bandwidth and channel number and provides these pieces of information to another node.

Only one IRM is present on a local bus and dynamically selected from candidates (nodes having the IRM function) every time bus reset is executed. The IRM may provide some of functions (e.g., management of connection configuration, power supply, and speed information) that can be provided by the bus manager (to be described later).

(3) Bus manager: The bus manager has the IRM function and provides a bus management function more advanced than the IRM. More specifically, the bus manager executes more advances power supply management (information representing whether power supply through a communication cable is possible or power supply is necessary is managed for each node), more advanced speed information management (the maximum transfer rate between the nodes is managed) and optimizes the bus on the basis of these pieces of management information. The bus manager also has a function of providing these pieces of information to another node.

The bus manager can also provide services for controlling the 1394 network to an application. The services include a serial bus control request (SB_CONTROL.request), serial bus event control confirmation (SB_CONTROL.confirmation), and serial bus event notification (SB_CONTROL.indication).

(1) SB_CONTROL.request: A service for causing an application to request bus reset.
(2) SB_CONTROL.confirmation: A service for confirming the SB_CONTROL.request for the application.
(3): SB_CONTROL.indication: A service for notifying the application of an event that asynchronously occurs.

[Address Designation]

Figure 5:
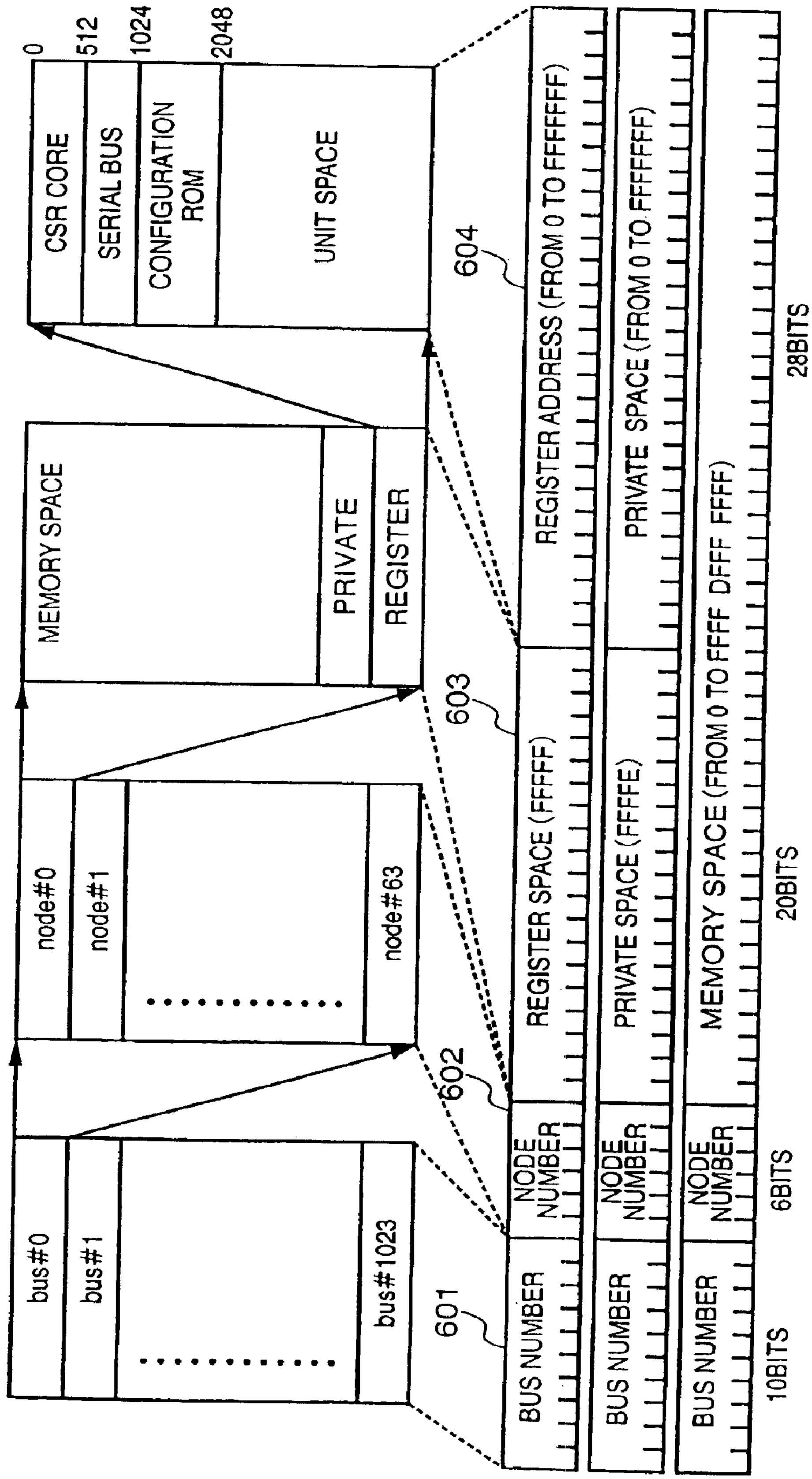
FIG. 5 is a view for explaining an address space in the 1394 serial bus.

FIG. 5 is a view for explaining an address space in the 1394 serial bus. For the 1394 serial bus, a 64-bit wide address space is defined in accordance with a CSR (Command and Status Register) architecture complying with the ISO/IEC 13213-1994.

Referring to FIG. 5, a first 10-bit field 601 is used for an ID number that designates a predetermined bus. A next 6-bit field 602 is used for an ID number that designates a predetermined device (node). The upper 16-bit data is called a "node ID". Each node identifies another node by the node ID. Each node can identify a partner using the node ID and communicate with the identified partner.

Fields formed from the remaining 48 bits designate the address space (256-Mbyte structure) of each node. Of these fields, a 20-bit field 603 designates a plurality of areas of the address space. A last 28-bit field 604 designates an address at which common or unique information is stored in each node.

An area from "0" to "0xFFFFD" of the field 603 is called a "memory space", an area at "0xFFFFE" is called a "private space", and an area at "0xFFFFF" is called a "register space". The private space has addresses which can be freely used by each node. The register space stores common information between the nodes connected to the bus. When the information stored in the register space is used, communication between the nodes is managed.

For example, the first 512 bytes in the register space are used for a CSR architecture core (CSR core) register. FIG. 6 is a view showing the addresses and functions of pieces of information stored in the CSR core register. FIG. 6 shows each address as an offset from "0xFFFFF0000000".

The next 512 bytes are used as a serial bus register. FIG. 7 is a view showing the addresses and functions of pieces of information stored in the serial bus register. FIG. 7 shows each address as an offset from "0xFFFFF0000200".

Figure 8:
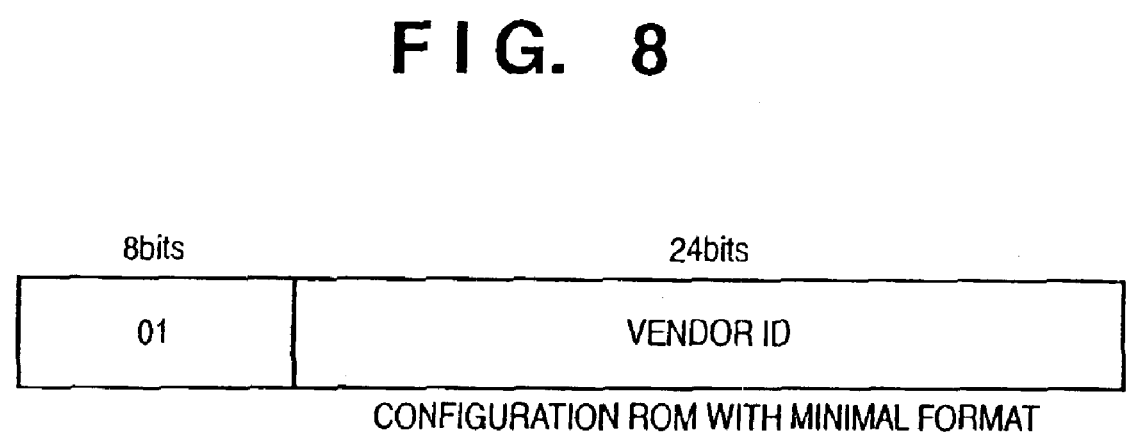

The next 1,024 bytes are used for a configuration ROM. The configuration ROM uses a minimal format or general format. FIG. 8 is a view showing a configuration ROM with a minimal format. A 24-bit vendor ID is a numerical value uniquely assigned to each vendor by the IEEE.

Figure 9:
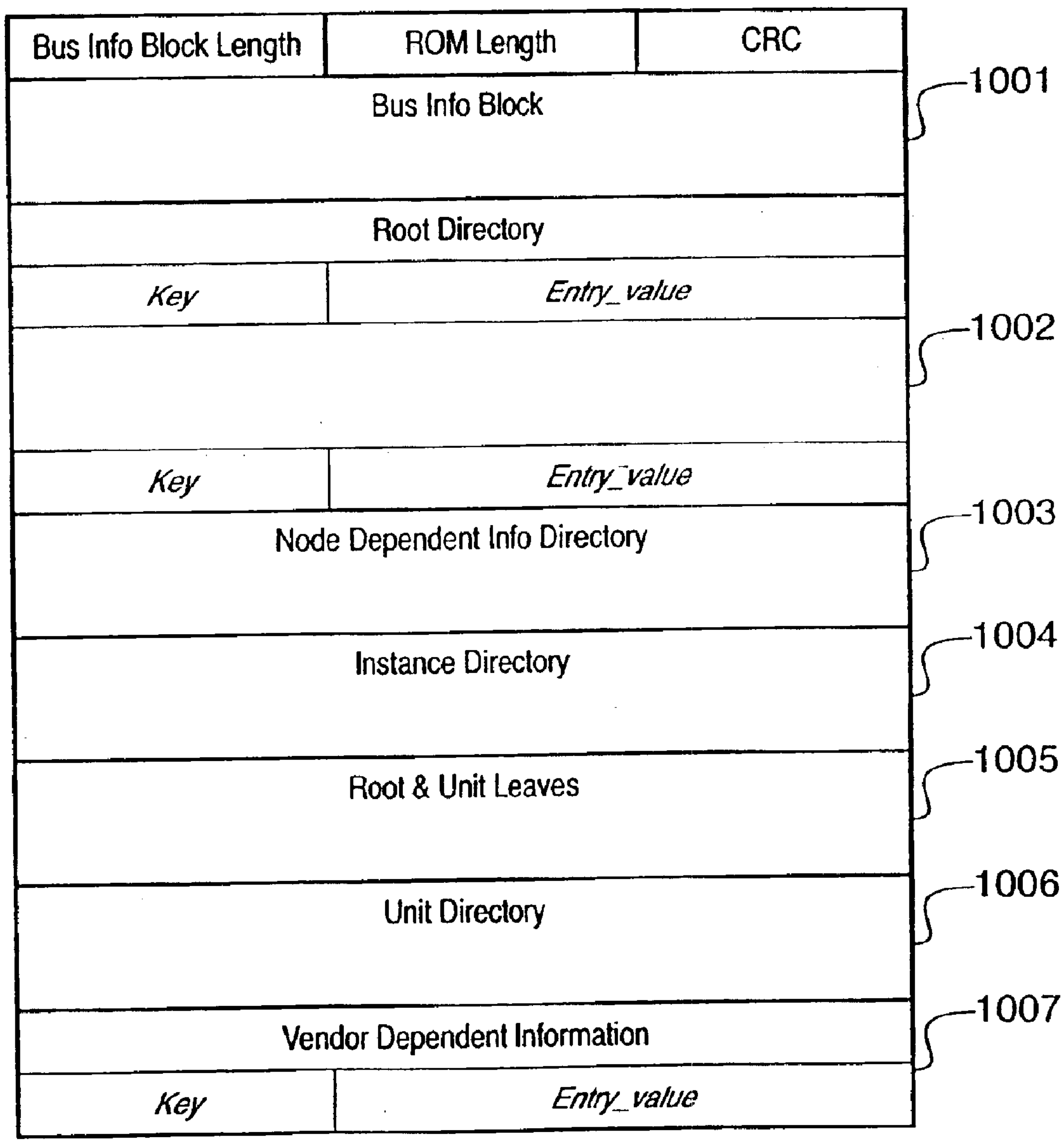
FIG. 9 is a view showing a configuration ROM with a general format.

FIG. 9 is a view showing a configuration ROM with a general format. The above-described vendor ID is stored in a root directory 1002. A bus info block 1001 and root & unit leaves 1005 can hold a node unique ID as unique ID information used to identify each node.

As a node unique ID, a unique ID capable of specifying one node is defined independently of the manufacturer and model. A node unique ID is formed from 64 bits. The upper 24 bits indicate the above-described vendor ID, and the lower 48 bits indicate information, e.g., a device manufacture number that can be freely set by the manufacturer which has manufactured the node device. The node unique ID is used to continuously recognize the specific node even before and after, e.g., bus reset.

The root directory 1002 can hold information related to the basic function of the node. Detailed function information is stored in a subdirectory (unit directory) 1006 offset from the root directory 1002. The unit directory 1006 stores information related to, e.g., a software unit supported by the node device. More specifically, the unit directory 1006 holds information related to a data transfer protocol used for data communication between the nodes and a command set for defining a predetermined communication procedure.

A node dependent info directory 1003 can hold information unique to the device. The node dependent info directory 1003 is offset by the root directory 1002.

Vendor dependent information 1007 can hold information unique to the vendor which manufactures or sells the node device.

Each data stored in the configuration ROM has a format including an entry, directory, and leaf as a predetermined minimum unit and a key value assigned to each entry in accordance with a predetermined rule. In each entry, the type of information can be discriminated by decoding the key value. The structure of the configuration ROM is described in more detail in ISO/IEC 13213, IEEE Std 1212, and IEEE Std 1394-1995, and a description thereof will be omitted here.

Referring to FIG. 5, the remaining area is called a "unit space" which designates addresses at which information unique to each node, e.g., identification information of each device (vendor name or model name) and use condition are stored. FIG. 10 is a view showing the addresses and functions of pieces of information stored in the serial bus unit register in the unit space. FIG. 10 shows each address as an offset from "0xFFFFF0000800".

Generally, to simplify the design of a different kind of bus system, each node should use only the first 2,048 bytes of the unit space. That is, the register space is preferably formed from a total of 4,096 bytes, i.e., the 2,048 bytes of the register space including the CSR core register, serial bus register, and configuration ROM, and the first 2,048 bytes of the unit space.

[Communication Cable]

Figure 11:
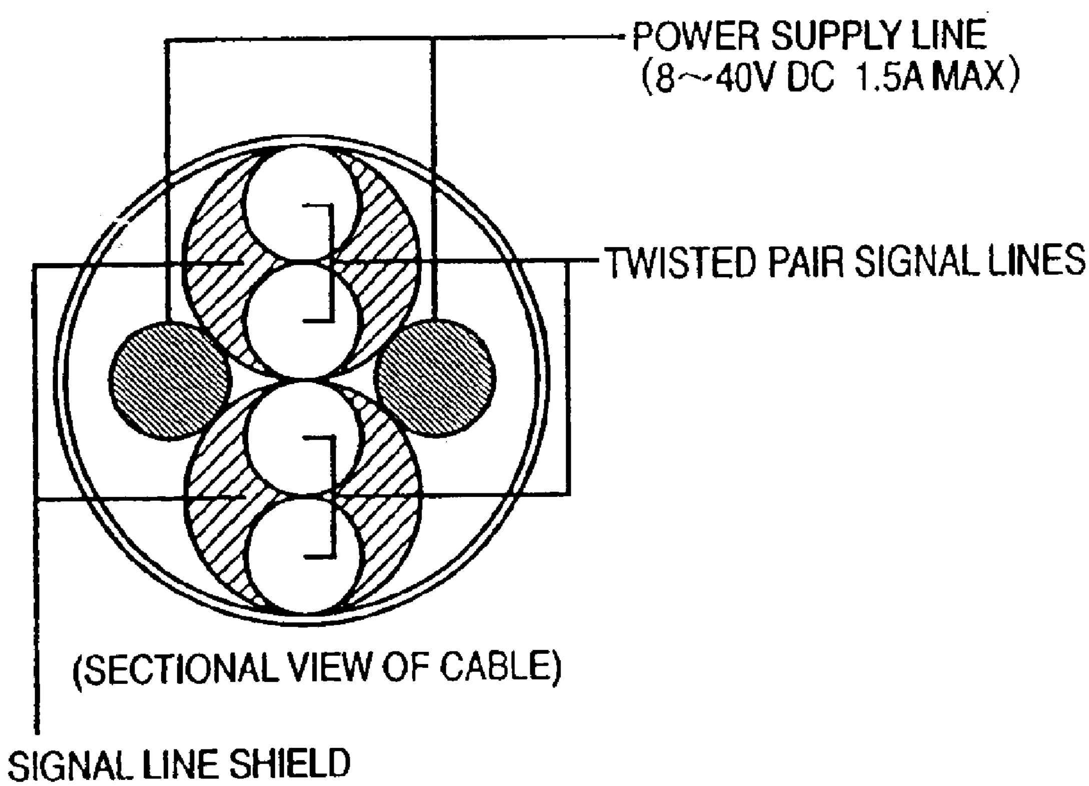
FIG. 11 is a sectional view of a communication cable complying with the IEEE 1394 standard.

FIG. 11 is a sectional view of a communication cable complying with the IEEE 1394 standard.

The communication cable comprises two sets of twisted pair signal lines and power supply lines. With the power supply lines, the 1394 serial bus can supply a power to a device whose main power is turned off or a device which has powered down due to a malfunction. The voltage of the DC power supplied through a power supply line is defined as 8 to 40 V, and the maximum current is defined as 1.5 A.

[DS-link Scheme]

Figure 12:
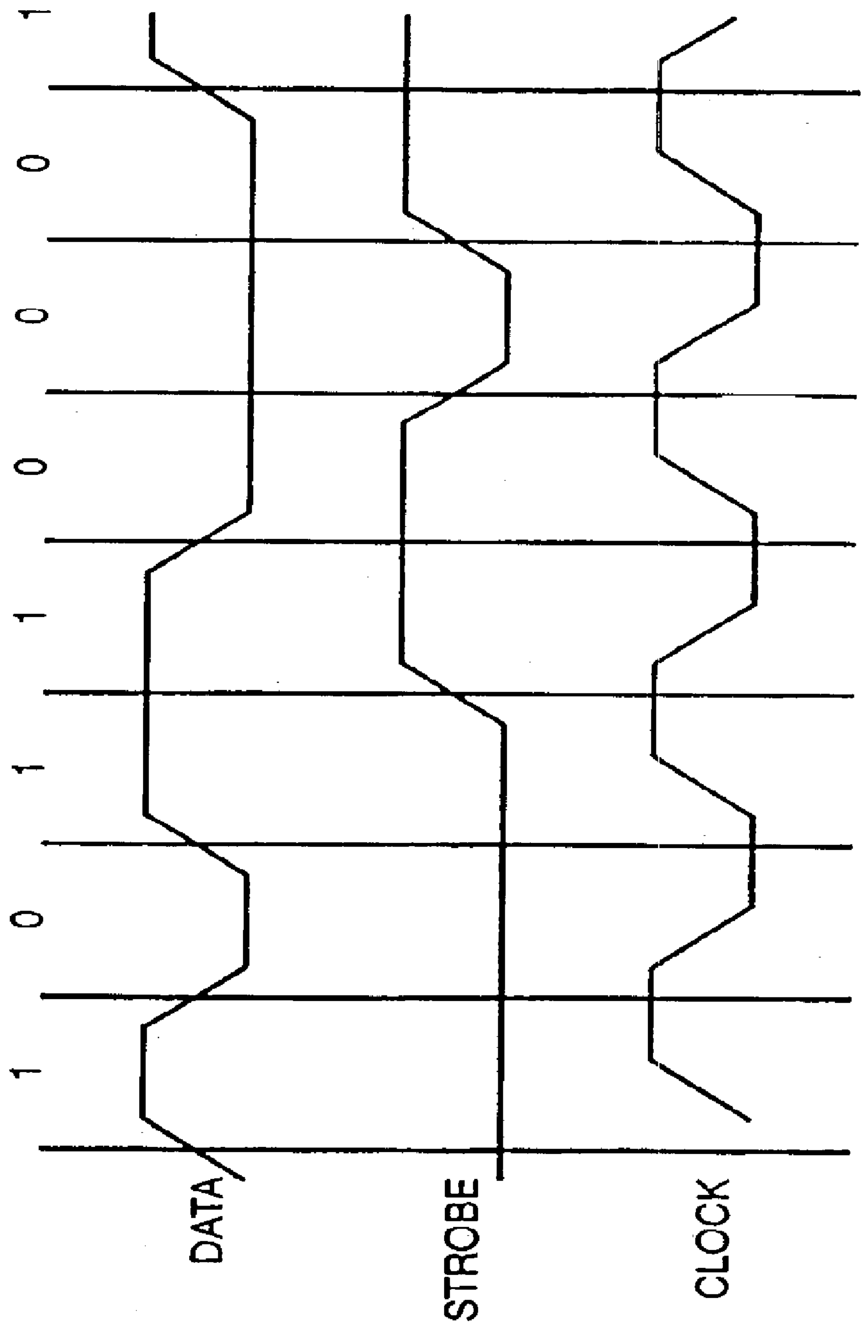
FIG. 12 is a view for explaining a DS-link scheme.

Information is transmitted to the two sets of twisted pair signal lines by a DS-link (Data/Strobe link) scheme. FIG. 12 is a view for explaining the DS-link scheme.

The DS-link scheme is adequate for high-speed serial data communication, and its arrangement requires two sets of twisted pair signal lines. One set of twisted pair signal lines send a data signal, and the other set of twisted pair signal lines send a strobe signal. The receiving side can reproduce a clock by exclusively ORing the data signal and strobe signal which are received by the two sets of signal lines. A 1394 serial bus using the DS-link scheme has the following advantages.

(1) Since no clock signal need be mixed into a data signal, the transfer efficiency is higher than any other serial data transfer scheme.

(2) Since no phase-locked loop (PLL) circuit is required, the circuit scale of the controller LSI can be made small.

(3) Since information representing an idle state need not be sent when data to be transferred is absent, the transceiver circuit can easily be set in a sleep state, and the power consumption can be reduced.

[Bus Reset]

The 1394 interface of each node can automatically detect a change in connection configuration of the network. In this case, the 1394 network executes processing called bus reset according to the procedure to be described below. A change in connection configuration can be detected as a change in bias voltage applied to the connector port 810 of each node.

A node which has detected a change in connection configuration of the network, e.g., an increase or decrease in number of nodes due to connection/disconnection or power ON/OFF of a network device, or a node which must newly recognize the connection configuration of the network transmits a bus reset signal onto the 1394 serial bus through the 1394 interface.

Upon receiving the bus reset signal, the physical layer 811 informs the link layer 812 of occurrence of bus reset and transfers the bus reset signal to the remaining nodes. Upon receiving the bus reset signal, each node clears the connection configuration of the network that has been recognized and node IDs assigned to the respective devices until that time. After all nodes have received the bus reset signal, each node automatically executes initialization processing in relation to the bus reset, i.e., recognition of the new connection configuration of the network and assignment of new node IDs.

Bus reset is activated not only by the above-described change in connection configuration of the network but also when the application layer 816 directly issues a command to the physical layer 811 under host control. When the bus reset is activated, data transfer is temporarily interrupted. After the initialization processing in relation to the bus reset is ended, data transfer is resumed under the new network.

[Sequence after Activation of Bus Reset]

After the activation of bus reset, the 1394 interface of each node recognizes the new connection configuration of the network and assigns new node IDs. The basic sequence from the activation of bus reset to the end of node ID assignment will be described below with reference to FIGS. 13 to 15.

Figure 13:
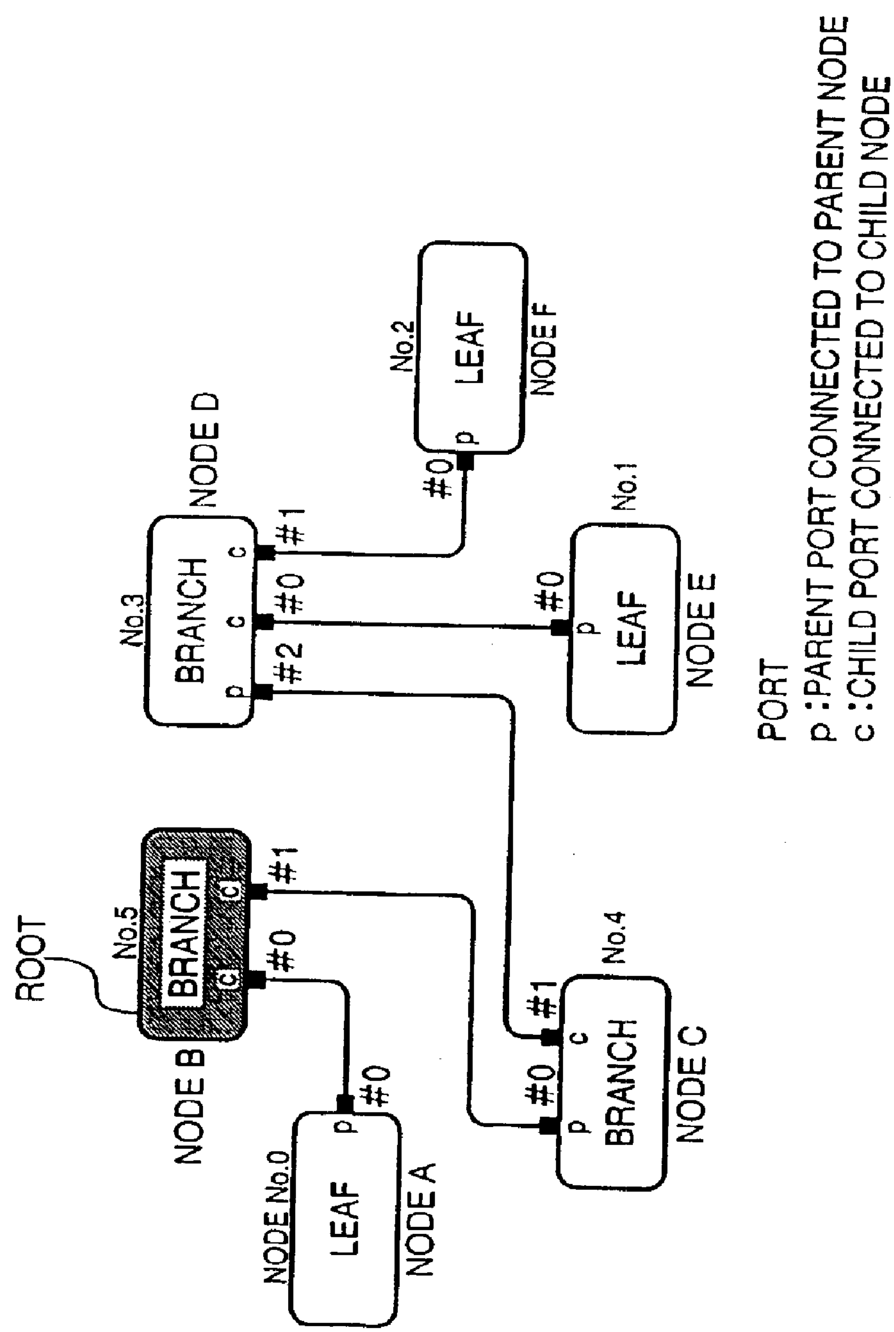
FIG. 13 is a view for explaining a state after the activation of bus reset in the 1394 network.

FIG. 13 is a view for explaining a state after the activation of bus reset in the 1394 network. Each of nodes A to F has one to three connector ports 810. Each connector port 810 of the nodes has a port number to identify itself. The procedure from the start of bus reset to node ID assignment in the 1394 network having the configuration shown in FIG. 13 will be described below with reference to the flow chart shown in FIG. 14.

Figure 14:
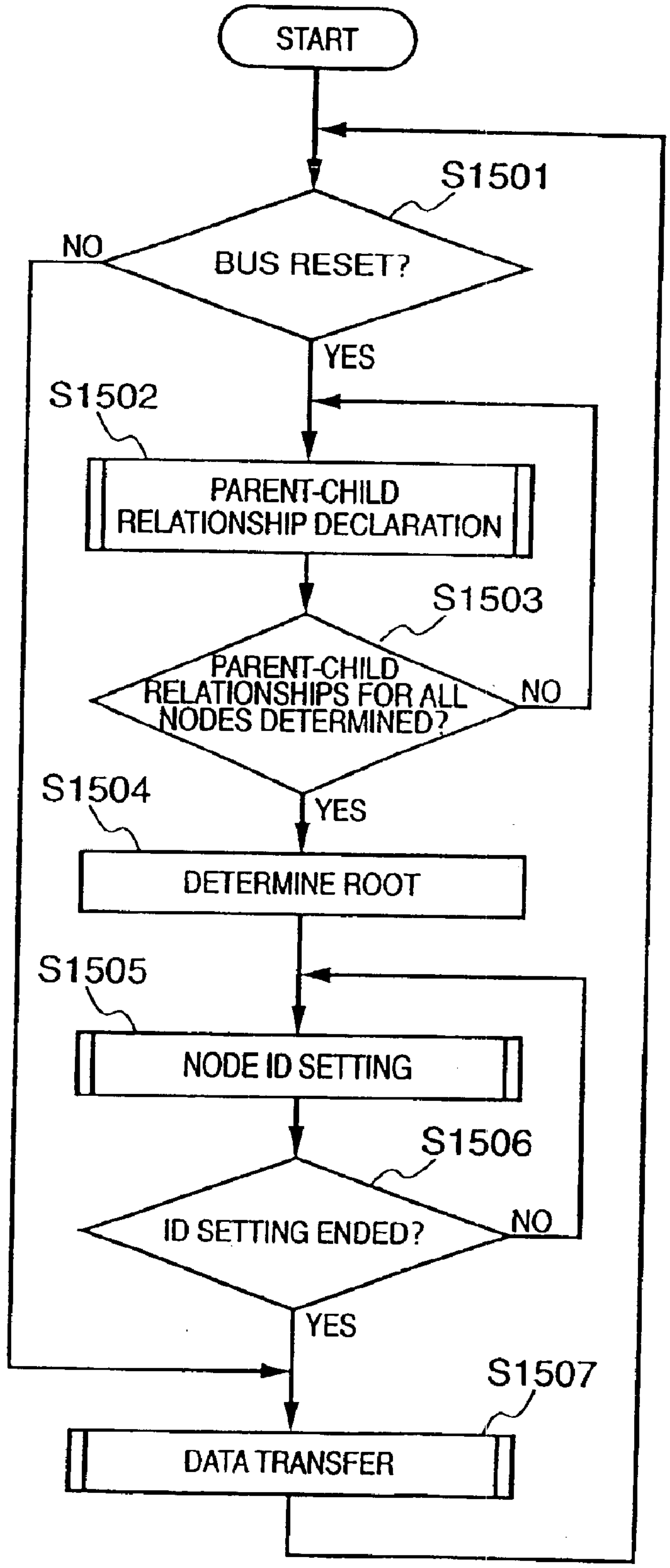
FIG. 14 is a flow chart showing the procedure from the start of bus reset to node ID assignment in the 1394 network.

Referring to FIG. 14, each of the nodes A to F of the 1394 network always monitors whether bus reset has occurred (S1501). When a node which has detected a change in connection configuration of the network outputs a bus reset signal (activation of bus reset), each node executes the following processing.

When bus reset is activated, each node declares a parent-child relationship (S1502). Step S1502 is repeated until it is determined in step S1503 that parent-child relationships are determined between all nodes.

After parent-child relationships are determined between all nodes, a node, i.e., a root which will execute arbitration of the 1394 network is determined (S1504). After the root is determined, each node starts operation of setting the node ID of its own (S1505). Step S1505 is repeated until it is determined in step S1506 that the node IDs of all nodes are set.

Finally, after the node IDs are set for all nodes, each node executes isochronous transfer or asynchronous transfer mode (S1507). Each node executes data transfer in step S1507 and monitors activation of bus reset in step S1501. When the bus reset is activated, processing from step S1502 is executed.

With the above procedure, every time bus reset is activated, each node can recognize the new network connection and assign new node IDs.

[Determination of Parent-child Relationship]

Figure 15:
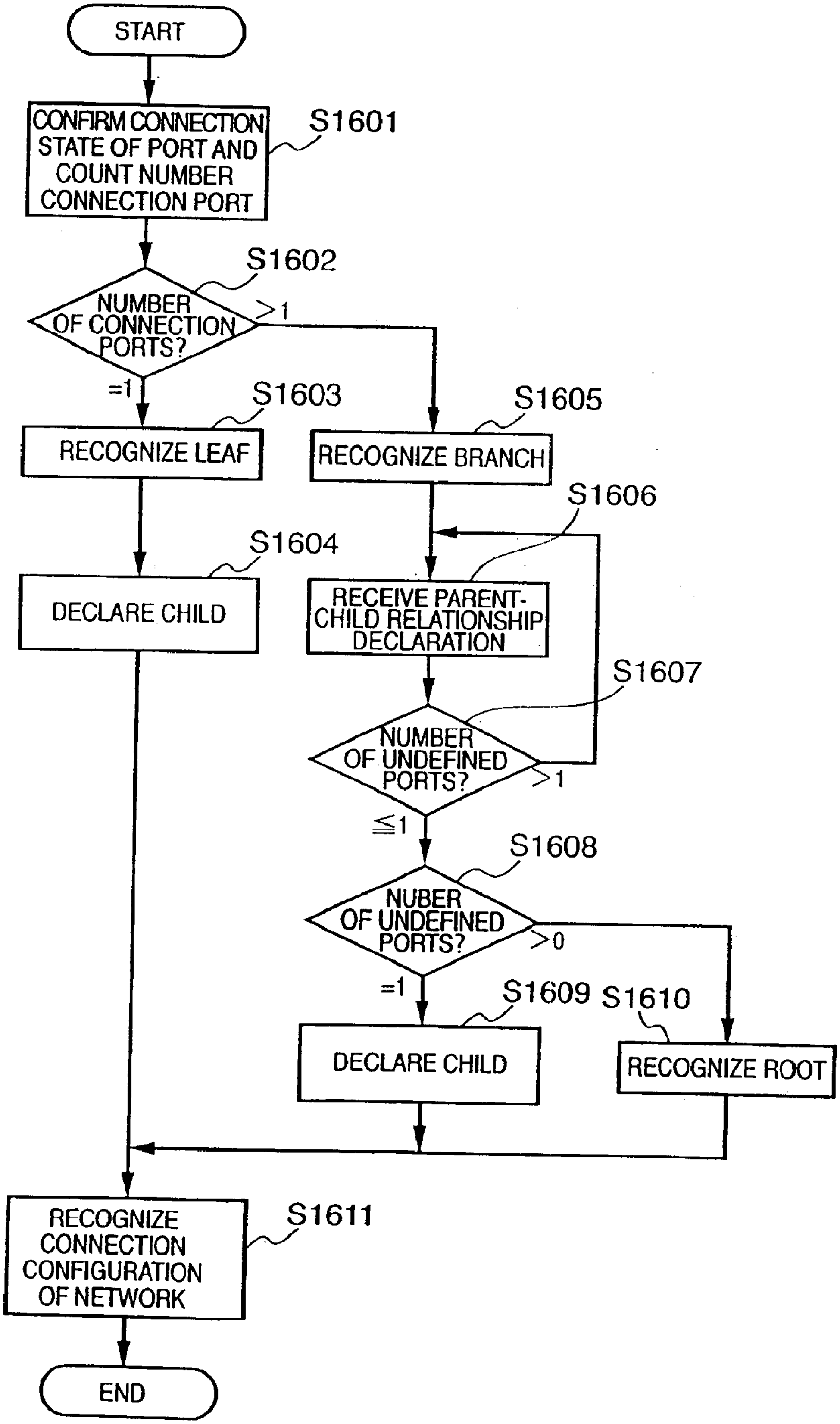
FIG. 15 is a flow chart showing details of processing for declaring a parent-child relationship.

FIG. 15 is a flow chart showing details of processing for declaring a parent-child relationship in step S1502.

Referring to FIG. 15, after bus reset is activated, each of the nodes A to F confirms the connection state (connected or unconnected state) of each connector port 810 of its own (S1601) and then counts the number of connector ports 810 (to be referred to as "connection ports" hereinafter) connected to other nodes (S1602).

A node having one connection port recognizes itself as a "leaf" (S1603). A "leaf" means a node to which only one node is connected. To the connected node, the leaf declares that it is a "child" (S1604), and the connected node recognizes itself as a "parent".

The parent-child relationship declaration is done first between each leaf located at the end of the 1394 network and a corresponding branch. Subsequently, a parent-child relationship is declared between branches. A "branch" means a node having two or more connection ports.

In this way, the parent-child relationships are sequentially determined between nodes capable of declaring a parent-child relationship. In each node, a connection port for which another node has declared that it is a "child" is recognized as a "parent port" connected to a parent node, and a connection port of a node which has received the declaration is recognized as a "child port" connected to the child node. For example, referring to FIG. 13, the nodes A, E, and F recognize themselves as leaves and declare parent-child relationships. Hence, the parent-child relationships between the nodes A and B, E and D, and F and D are determined as "child-parent".

A node having two or more connection ports recognizes itself as a branch (S1605). The branch receives parent-child relationship declaration from nodes connected to the connection ports (S1606). Each connection port for which the parent-child relationship declaration has been received is recognized as a "child port".

Each branch recognizes one connection port as a "child port" and then detects whether two or more connection ports (undefined ports), for which parent-child relationships have not been determined yet, still remain (S1607). If two or more undefined ports are present, processing in step S1606 is executed. If only one undefined port remains (S1608), the branch recognizes the undefined port as a "parent port" and declares the node connected to the connection port a "child" (S1609).

A branch cannot declare a parent-child relationship, i.e., that it is a "child", to another node until the number of undefined ports becomes one. For example, referring to FIG. 13, the nodes B, C, and D recognize themselves as branches and receive parent-child declaration from a leaf or another branch. After the parent-child relationships between the nodes D and E and between the nodes D and F are determined, the node D declares the node C a parent-child relationship. The node C which has received the parent-child relationship declaration declares the node B a parent-child relationship.

If it is determined in step S1608 that no undefined port is present, i.e., when all connection ports are recognized as "child ports", the branch recognizes itself as a root (step S1610).

For example, referring to FIG. 13, the node B in which all connection ports are defined as child ports is recognized by the remaining nodes as a root for arbitrating communication on the 1394 network. FIG. 13 shows an example in which the node B is determined as a root. However, if the parent-child relationship declaration by the node B is executed before that by the node C, another node becomes a root. That is, any node may be a root depending on the timing of parent-child relationship declaration. The node serving as a root is not always a specific node even in the same network configuration.

When the parent-child relationships of all connection ports are declared, each node can recognize the connection configuration of the 1394 network as a hierarchical structure (tree structure) (S1611). The above-described parent nodes are upper nodes in the hierarchical structure, and the child nodes are lower nodes in the hierarchical structure.

[Node ID Assignment]

Figure 16:
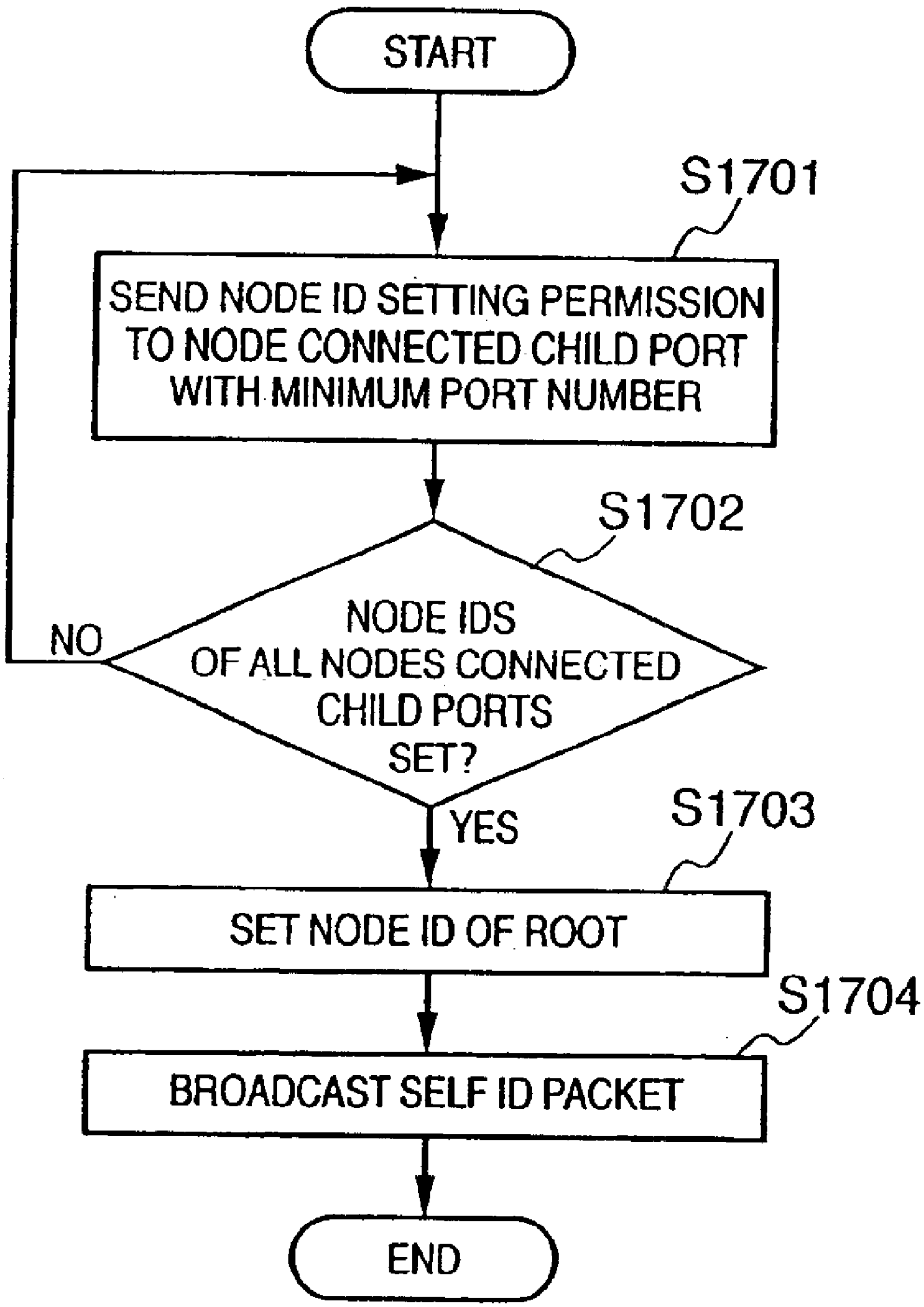
FIG. 16 is a flow chart showing details of processing for assigning a node ID to each node.
Figure 17:
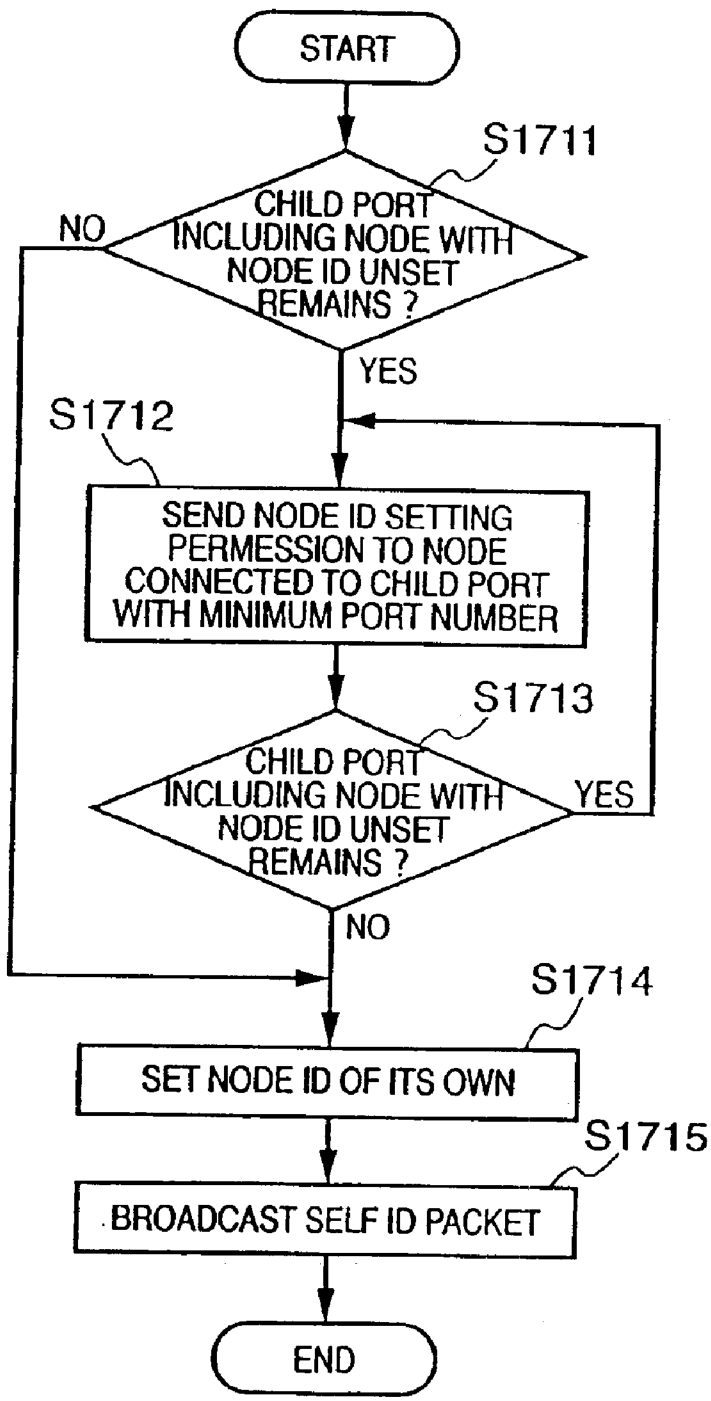
FIG. 17 is a flow chart showing details of processing for assigning a node ID to each node.

FIGS. 16 and 17 are flow charts showing details of node ID setting in step S1505, i.e., processing for assigning a node ID to each node. FIG. 16 shows processing by a root, and FIG. 17 shows processing by a node other than the root. A node ID is formed from a bus number and node number, as described above. In this embodiment, assume that the nodes are present on a single bus and have the same bus number assigned.

In step S1701, the root issues a node ID setting permission to a node connected to, of child ports connected to nodes with no node IDs set, a connection port having a minimum port number. The root determines next in step S1702 whether node IDs are set for all nodes connected to the child ports. If an unset node remains, step S1701 is repeated. That is, after a node ID is set for the node connected to the connection port with the minimum port number, the root recognizes the child port as a set port and subsequently executes the same control as described above for the node connected to the connection port with the second small port number.

Finally, when node IDs are set for all nodes connected to the child ports, the root sets the node ID of its own in step S1703 and broadcasts a self ID packet (to be described later) in step S1704. Node numbers contained in the node IDs are basically assigned as 0, 1, 2, . . . in an order of leaves and branches. Hence, the root has a largest node number.

On the other hand, the node which has obtained the node ID setting permission from the root determines in step S1711 whether a child port including a node with a node ID unset is present. If YES in step S1711, a node ID setting permission is sent to the node connected to the child port. The node which has received the node ID setting permission here also executes processing shown in FIG. 17.

The node determines again in step S1713 whether a child port including a node with a node ID unset is present. If it is determined in step S1711 or S1713 that no child port including a node with a node ID unset is present, the node sets the node ID of its own in step S1714 and broadcasts a self ID packet containing the node number of its own and information related to the connection state of the connection port in step S1715.

"Broadcast" means transferring a communication packet from a node to all many unspecified remaining nodes of the 1394 network. Each node can recognize the node numbers assigned to the respective nodes and know a node ID that can be assigned to itself by receiving self ID packets.

For example, referring to FIG. 13, the node B serving as a root issues a node ID setting permission to the node A connected to the connection port with minimum port number #0. The node A assigns "0" as the node number of its own and sets the node ID of its own, and then, broadcasts a self ID packet containing the node ID.

Next, the root issues a node ID setting permission to the node C connected to the connection port with port number #1. The node C issues a node ID setting permission to the node D connected to the connection port with port number #1. The node D issues a node ID setting permission to the node E connected to the connection port with port number #0. When the node ID of the node E is set, the node D issues a node ID setting permission to the node F connected to the connection port with port number #1. The node IDs of all nodes are set according to the above procedure, though a detailed description thereof will be omitted.

[Self ID Packet]

Figure 18:
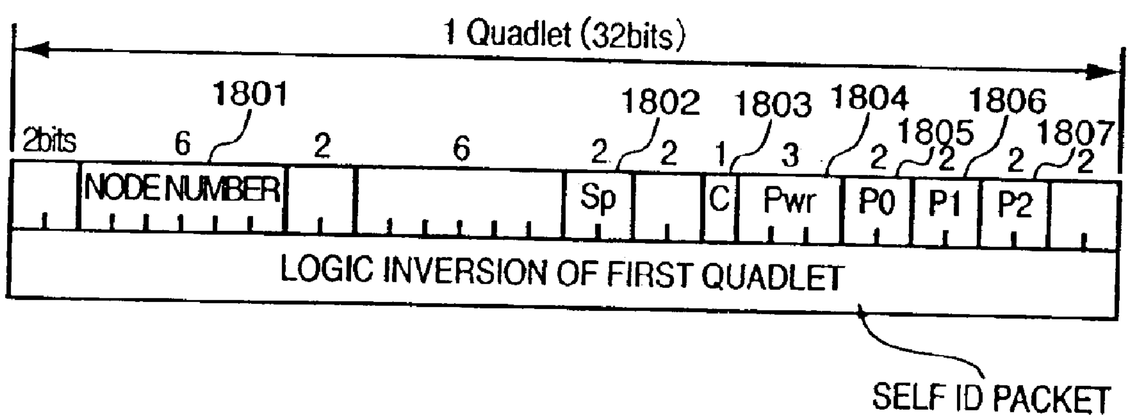
FIG. 18 is a view showing the structure of a self ID packet.

FIG. 18 is a view showing the structure of a self ID packet. A self ID packet has a field 1801 where the node number of the node that has sent the self ID packet is stored, a field 1802 where information related to compatible transfer rates is stored, a field 1803 representing the presence/absence of a bus management function (e.g., the presence/absence of the capability of the bus manager), and a field 1804 wherein information related to power consumption and supply characteristics is stored. The self ID packet also includes fields 1805 to 1807 where pieces of information (e.g., the connected or unconnected state and the parent-child relationship between the ports) related to the connection states of the connector ports 810 with port numbers "#0" to "#2" are stored.

The contender bit in the field 1803 is "1" when the node which has sent the self ID packet has a bus manager capability, and otherwise "0". A bus manager is a node having functions of executing the following management on the basis of various kinds of information contained in a self ID packet and providing the pieces of information to the remaining nodes. With these functions, a bus manager can execute bus management for the entire 1394 network.

(1) Power management for bus: The bus manager manages for each node information representing whether power supply through a communication cable is possible or whether power supply is necessary.

(2) Speed information management: The bus manager manages the maximum transfer rate between nodes on the basis of information related to the compatible transfer rates of each node.

(3) Topology map information management: The bus manager manages the connection configuration of the network on the basis of the parent-child relationship information of connection ports.

(4) Bus optimization based on topology map information and the like.

After node ID setting processing, when a plurality of nodes have the bus manager capability, a node having a largest node number becomes a bus manager. That is, when a root which has a maximum node number in the 1394 network has a bus manager function, the root serves as a bus manager. However, when the root does not have that function, a node with a largest node number next to the root serves as a bus manager. Which node serves as a bus manager can be grasped by checking the contender bit 1803 in a self ID packet broadcast by each node.

[Arbitration]

Figure 19A:
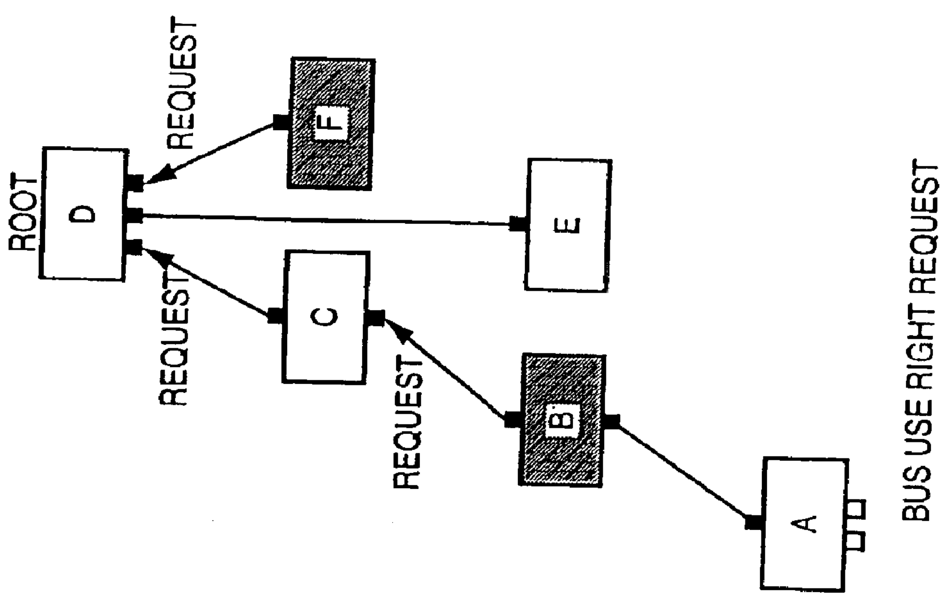
FIGS. 19A and 19B are views for explaining arbitration in the 1394 network.
Figure 19B:
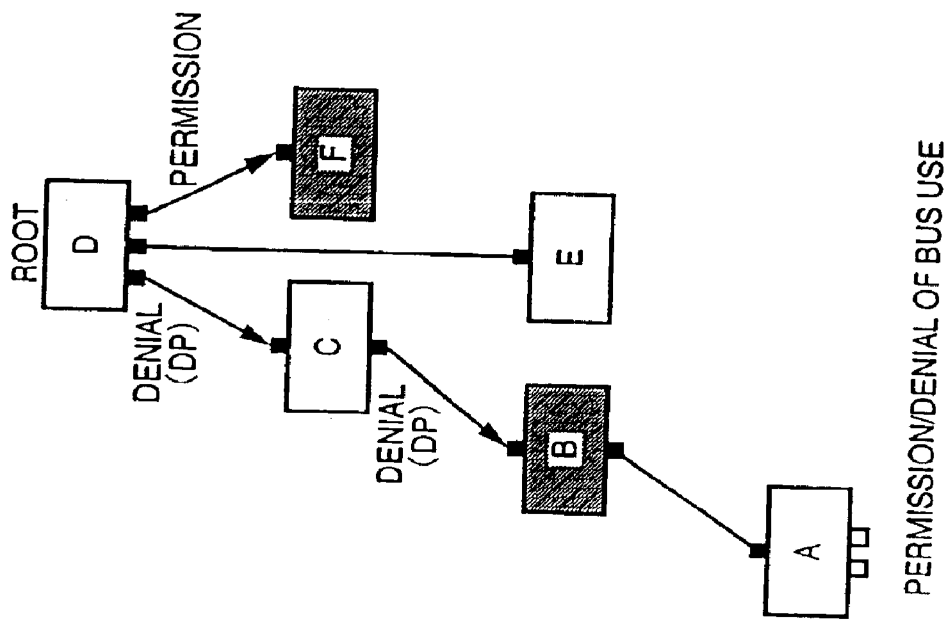

FIGS. 19A and 19B are views for explaining arbitration in the 1394 network. In the 1394 network, the bus use right is always arbitrated before data transfer. The 1394 network is a logical bus network and transfers a single packet to all nodes in the network by relaying a packet sent from each node to the remaining nodes. To prevent collision of packets, arbitration is indispensable. Only one node can send a packet at a given timing.

FIG. 19A shows a state wherein the nodes B and F request a bus use right. The nodes B and F request the bus use right of their parent nodes. The parent node (node C) that has received the request from the node B relays the request to the parent node (node D) of its own. These requests are finally received by the root (node D) which executes arbitration. Upon receiving the bus use right requests, the root arbitrates to determine which node is to obtain the bus use right. This arbitration can be executed only by the root. A node which wins in arbitration obtains the bus use right.

FIG. 19B shows a state wherein a bus use right is given to the node F, and the request from the node B is denied. The root sends a DP (Data Prefix) packet to the node which loses in arbitration, thereby notifying the node of denial of the request. The node whose request is denied waits until a bus use right request is granted in the next arbitration.

With the above arbitration, the bus use right in the 1394 network is controlled and managed.

[Communication Cycle]

Figure 20:
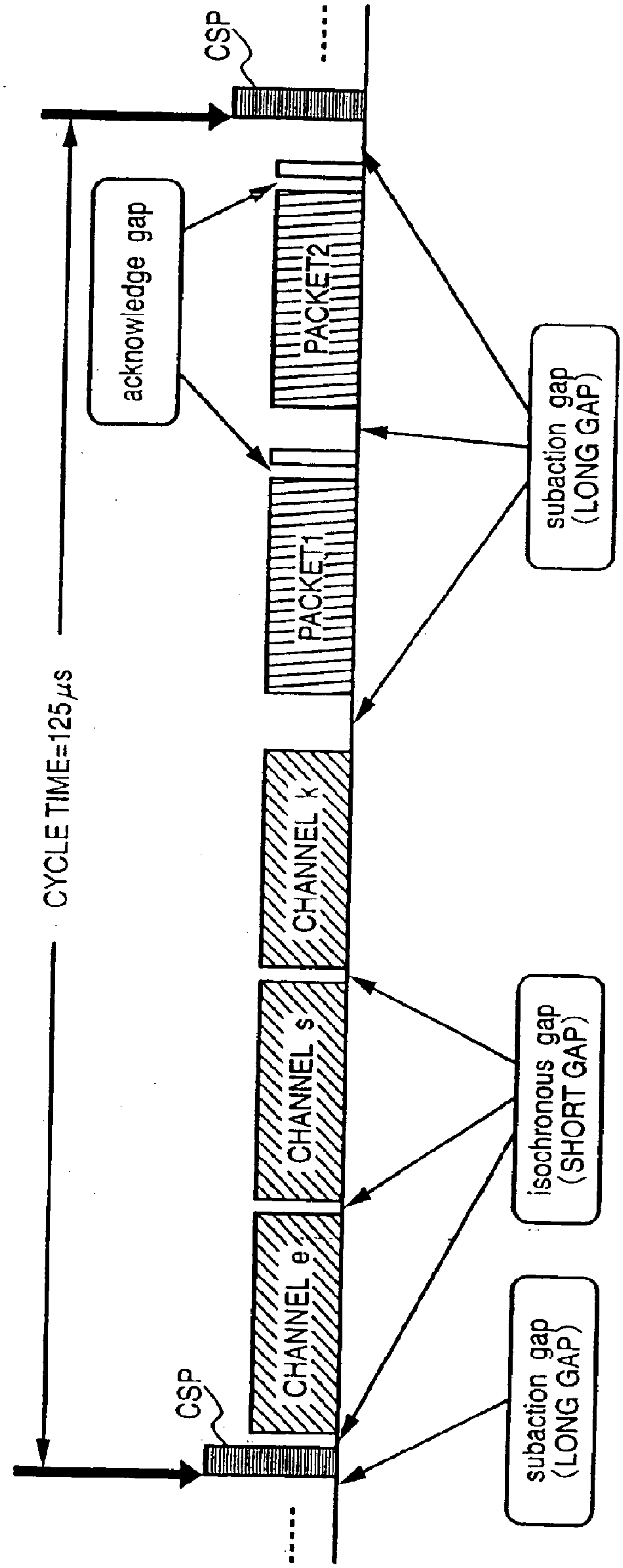
FIG. 20 is a view showing a state wherein the isochronous transfer mode and asynchronous transfer mode are mixed in one period of communication cycle.

The isochronous transfer mode and asynchronous transfer mode can be time-divisionally mixed in a period of communication cycle. The period of a communication cycle is normally 125 $\mu$s. FIG. 20 is a view showing a state wherein the isochronous transfer mode and asynchronous transfer mode are mixed in one period of communication cycle.

The isochronous transfer mode is preferentially executed before the asynchronous transfer mode. This is because an idle period (subaction gap) necessary to activate the asynchronous transfer after a cycle start packet (CSP) is set to be longer than an idle period (isochronous gap) necessary to activate the isochronous transfer mode. Since different idle periods are set, the isochronous transfer mode is preferentially executed before the asynchronous transfer mode.

Referring to FIG. 20, a cycle start packet (CSP) is transferred from a predetermined node at the start of each communication cycle. Each node adjusts the timing in accordance with the cycle start packet (CSP), thereby obtaining the same timing as for the remaining nodes.

[Isochronous Transfer Mode]

The isochronous transfer mode is a synchronous transfer scheme. The isochronous transfer mode can be executed in a predetermined period after the start of a communication cycle. In addition, the isochronous transfer mode is always executed every cycle to maintain real-time transfer.

The isochronous transfer mode is especially suitable to transfer data that requires real-time transfer, e.g., moving image data or sound data containing audio data. Unlike the asynchronous transfer mode, the isochronous transfer mode is not one-to-one communication but broadcast communication in which a packet sent from a given node is equally transferred to all nodes on the network. The isochronous transfer uses no acknowledge (ack) as a return code for reception confirmation.

Referring to FIG. 20, channel e (ch e), channel s (ch s), and channel k (ch k) indicate periods in which a node executes isochronous transfer. To discriminate between the plurality of different isochronous transfer channels, the 1394 serial bus assigns different channel numbers to them. A channel number does not specify the transmission destination but merely gives a logical number to data.

The isochronous gap shown in FIG. 20 indicates the idle state of the bus. When a predetermined time has elapsed after the idle state is set, a node which wants to execute isochronous transfer determines that the bus can be used and requests a bus use right.

Figure 21:
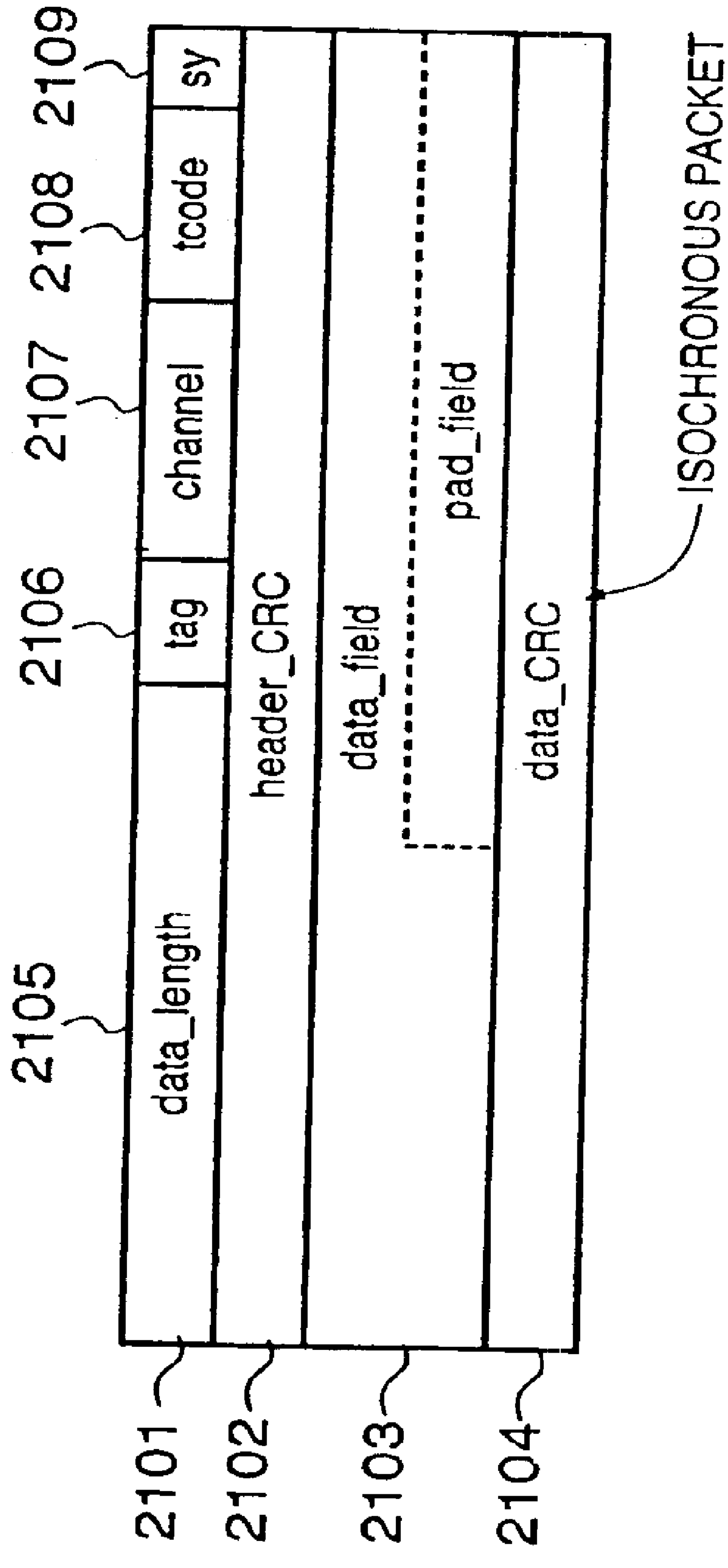
FIG. 21 is a view showing the format of a packet transferred in the isochronous transfer mode.

FIG. 21 is a view showing the format of a packet transferred in the isochronous transfer mode. A packet transferred in the isochronous transfer mode will be referred to as an "isochronous packet" hereinafter.

Referring to FIG. 21, an isochronous packet is formed from a header field 2101, header CRC 2102, data field 2103, and data CRC 2104.

The header field 2101 includes a data_length field 2105 where the data length of the data field 2103 is stored, a tag field 2106 where the format information of the isochronous packet is stored, a channel field 2107 where the channel number of the isochronous packet is stored, a tcode field 2108 where a transaction code (tcode) for identifying the format of the packet and processing that must be executed is stored, and an sy field 2109 where a synchronizing code is stored.

[Asynchronous Transfer Mode]

The asynchronous transfer mode is an asynchronous transfer scheme. Asynchronous transfer can be executed between the end of the isochronous transfer period and the start of the next communication cycle, i.e., before the cycle start packet (CSP) of the next communication cycle is transferred.

Figure 22:
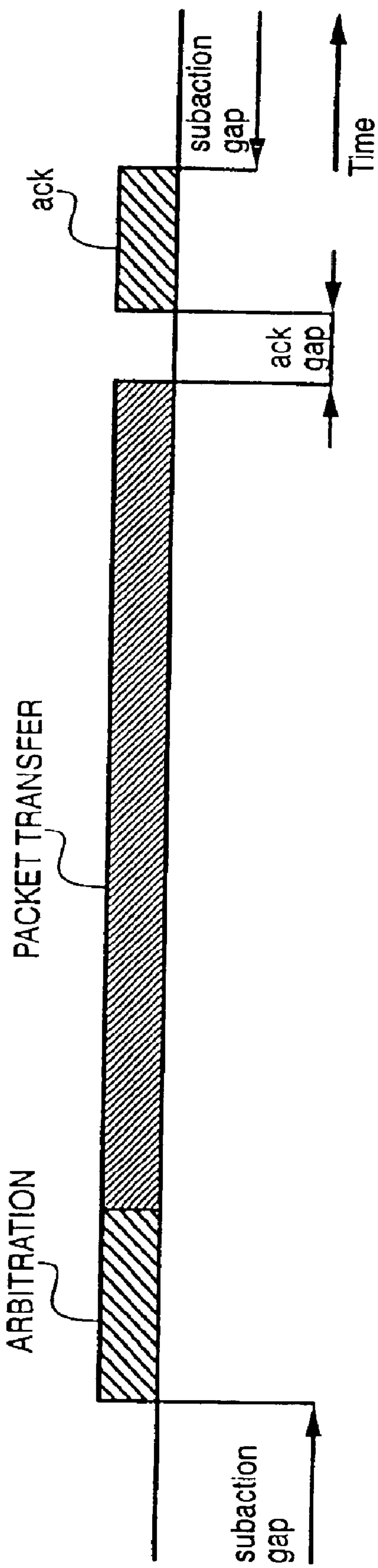
FIG. 22 is a view showing a communication cycle.

In the communication cycle shown in FIG. 22, the first subaction gap indicates an idle state of the bus. When a predetermined time has elapsed after an idle state is set, a node which wants to execute asynchronous transfer determines that the bus can be used and requests a bus use right.

Figure 23:
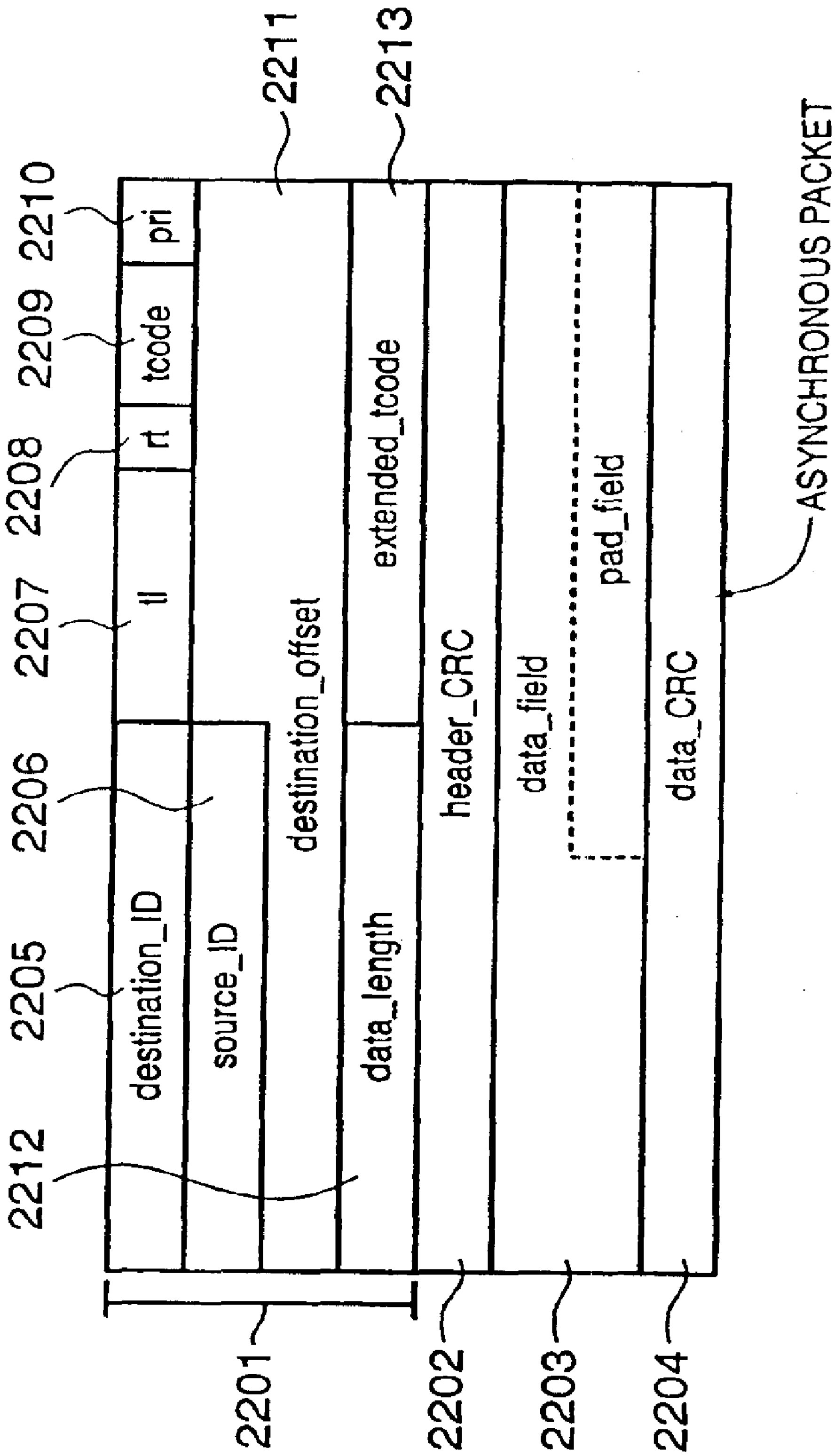
FIG. 23 is a view showing the format of a packet transferred in the asynchronous transfer mode.

A node which has obtained a bus use right by arbitration transmits a packet shown in FIG. 23 to a predetermined node. Upon receiving the packet, the node returns an ack (acknowledge) or response packet after an acknowledge gap (ack gap). An ack is formed from 4-bit information and 4-bit check sum and contains information representing success, busy state, or pending state. The ack is returned to the packet transmission source node immediately after the packet is received.

FIG. 23 is a view showing the format of a packet transferred in the asynchronous transfer mode. A packet transferred in the asynchronous transfer mode will be referred to as an "asynchronous packet" hereinafter.

Referring to FIG. 23, an asynchronous packet is formed from a header field 2201, header CRC 2202, data field 2203, and data CRC 2204.

The header field 2201 includes a destination_ID field 2205 where the node ID of a packet destination node is stored, a source_ID field 2206 where the node ID of a packet source node is stored, a t1 field 2207 where a label indicating a series of transactions is stored, an rt field 2208 where a code indicating a retry status is stored, a tcode field 2209 where a transaction code (tcode) for identifying the format of the packet and processing that must be executed is stored, a pri field 2210 where the priority order is stored, a destination_offset field 2211 where the memory address of the destination node is stored, a data_length field 2212 where the data length of the data field is stored, and an extended_tcode field 2213 where an extended transaction code is stored.

Asynchronous transfer is one-to-one communication from a node to a partner node. A packet transmitted from a transmission source node reaches all nodes in the 1394 network. However, since each node neglects any packet except one addressed to itself, only the destination node reads the packet.

Even when the next CSP transfer time comes during asynchronous transfer, the transfer is not forcibly interrupted. The next CSP is transferred after the end of the asynchronous transfer. If one communication cycle has continued for 125 $\mu$m or more, the next communication cycle is shortened. With this processing, the 1394 network can maintain an almost predetermined communication cycle.

FIG. 24 is a view for explaining details of the packet fields in the respective packet formats.

[Device Discovery]

A 1394 serial bus has the following means for knowing information (connection topology) of devices connected to the 1394 network to communicate with a device desired by application software.

(1) A means for reading the topology map register of the bus manager.

(2) A means for estimating the topology from a self ID packet at the time of bus reset.

With the above means, the topology of connection order of the 1394 cable can be known from the parent-child relationships between nodes. However, the topology of physical positional relationships cannot be known, and even ports which are not actually there can be seen.

A device compatible to or complying with the IEEE 1394 standard always has a configuration ROM or a function of reading a configuration ROM. When pieces of information of the position and function of a device are stored in the configuration ROM of each node, and a function of reading the pieces of information from application software is prepared, the application software of each node can realize a function of displaying a so-called device map independently of any specific protocol for database access or data transfer. A configuration ROM can store a physical position and function as information unique to a node and therefore can be used to realize the device map display function.

A device which complies with the IEEE 1394 standard always has a function of reading and analyzing the isochronous transfer mode of a connected device to cause an application on the device to specify a communication partner device. When pieces of information representing the vendor information, function, and support (protocol) software of a device are stored in the configuration ROM of each node, and a function of reading the pieces of information from an application is prepared, a device desired by the application of each node can be specified independently of any specific protocol for data transfer or the like.

With this arrangement, application software can read information from the configuration ROM of each node and know the topology of the 1394 network based on a physical positional relationship at the time of bus reset or in response to a request from a user. In addition to the physical position of each node, the function information of each node can be obtained by reading various kinds of node information such as a function described in the configuration ROM.

In causing application software to acquire information from the configuration ROM of each node, an application interface (API) for acquiring information from an arbitrary configuration ROM of a designated node is used. When such a means is used, the application software of a device on the 1394 network can create various device maps and lists in accordance with an application purpose, such as a physical topology map and the function map of each node. In addition, the application software also allows the user to select a device having a necessary function.

In actually reading a ROM, various methods can be used. If no user request is received as in bus reset, minimum necessary information may be read out from the configuration ROM of each device connected to the 1394 network, and upon receiving a communication start request, all pieces of information may be read out from the configuration ROM of a device that is narrowed down for the minimum necessary information. Alternatively, upon receiving a user request, information may be read out from the configuration ROM of each device for the first time.

[Printer]

Arrangement

Figure 25:
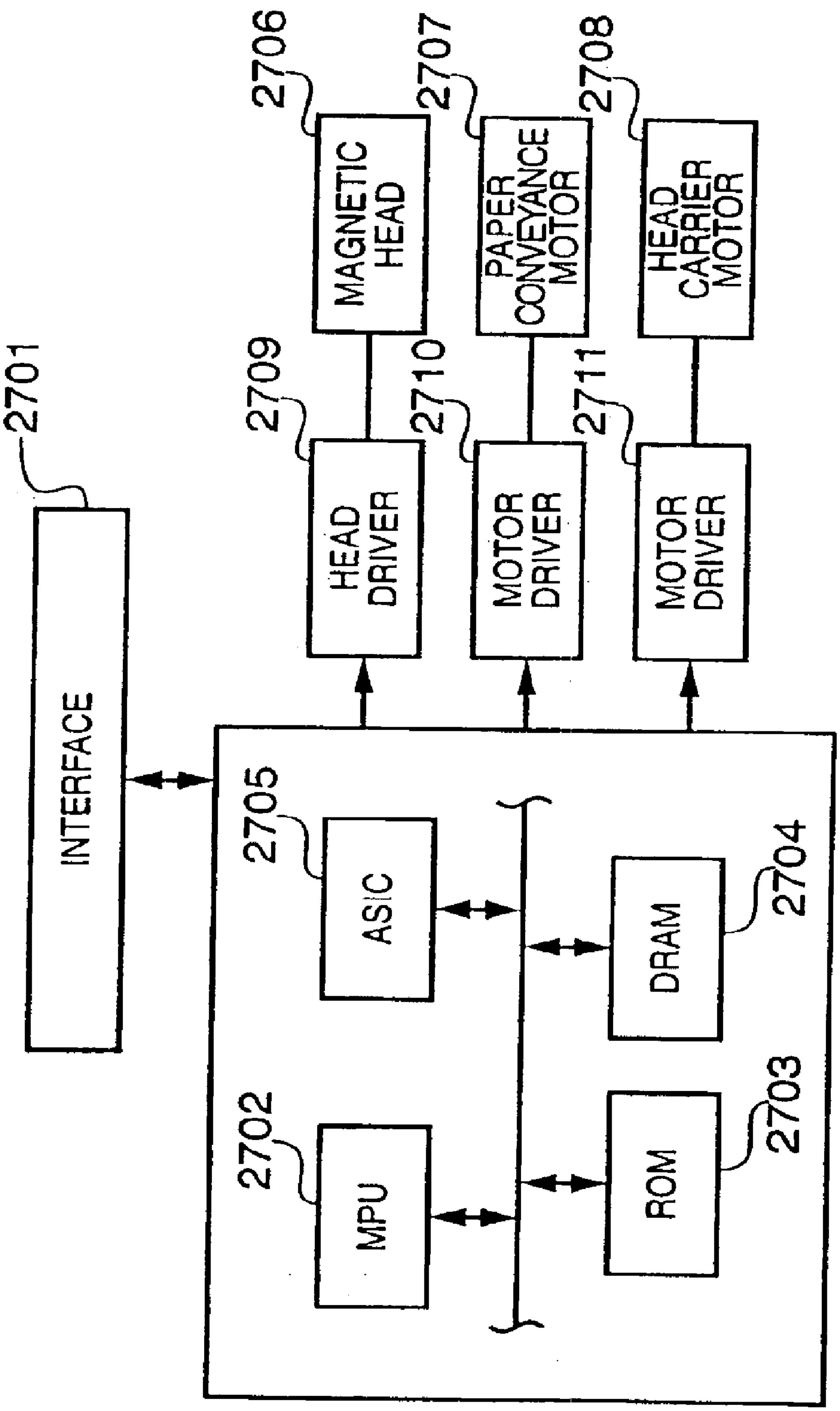
FIG. 25 is a block diagram for explaining the arrangement of an inkjet printer according to the embodiment.

FIG. 25 is a block diagram for explaining the arrangement of an inkjet printer according to the embodiment.

Referring to FIG. 25, reference numeral 2701 denotes an interface section which communicates with a computer through a 1394 serial bus to receive a print command or print data; 2702, a microprocessor unit (MPU); 2703, a ROM which stores a control program to be executed by the MPU 2702 or received print information; and 2704, a RAM which stores various data such as print information or print data to be supplied to a head and is used as a work memory.

A gate array 2705 is an ASIC for controlling supply of print data to a printhead 2706. The gate array 2705 also controls data transfer between the interface 2701 and the MPU 2702 or RAM 2704.

A carrier motor 2708 conveys the printhead 2706. A conveyance motor 2707 conveys a printing paper sheet. A head driver 2709 drives the printhead. A motor driver 2710 drives the conveyance motor 2707.

1394 Interface Block

Figure 26:
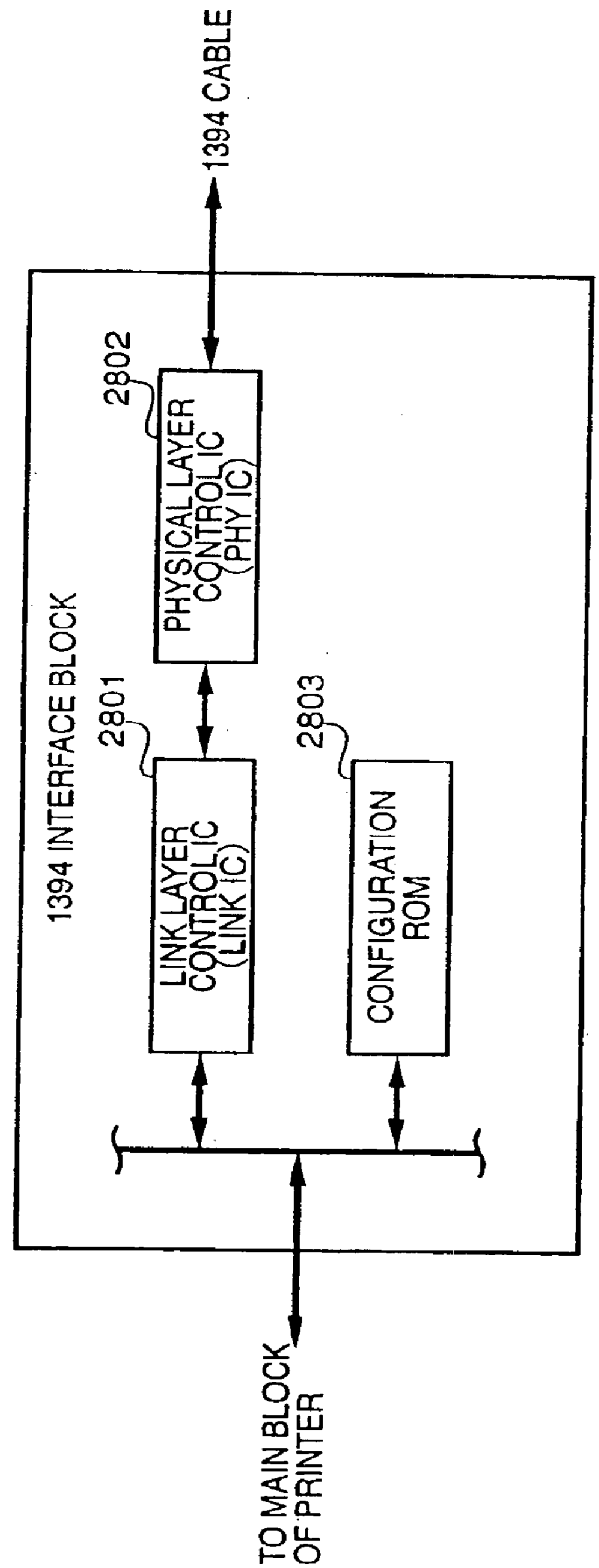
FIG. 26 is a block diagram showing the basic arrangement of a 1394 interface block.

FIG. 26 is a block diagram showing the basic arrangement of the 1394 interface block in the interface 2701.

Referring to FIG. 26, a physical layer control IC (PHY IC) 2802 directly drives the 1394 serial bus and realizes the physical layer function described above in the outline of the IEEE 1394. As its main functions, the physical layer control IC 2802 initializes the bus, executes arbitration, encodes/decodes transmission/reception data, monitors the energization state of the 1394 cable, supplies load terminal power (for active connection recognition), and interfaces to a link layer control IC 2801.

The link layer control IC (LINK IC) 2801 interfaces to the printer main body and controls data transfer of the physical layer IC 2802. The link layer control IC 2801 realizes the link layer function described above in the outline of the IEEE 1394. As its main functions, the link layer control IC 2801 serves as a transmission/reception FIFO for temporarily storing data transmitted/received through the physical layer IC 2802, forms a packet of transmission data, determines whether an asynchronous packet received by the physical layer IC 2802 is addressed to the self node, determines whether an isochronous packet is for an assigned channel, executes a receiver function for checking an error in received data, and interfaces to the printer main body.

Figure 30:
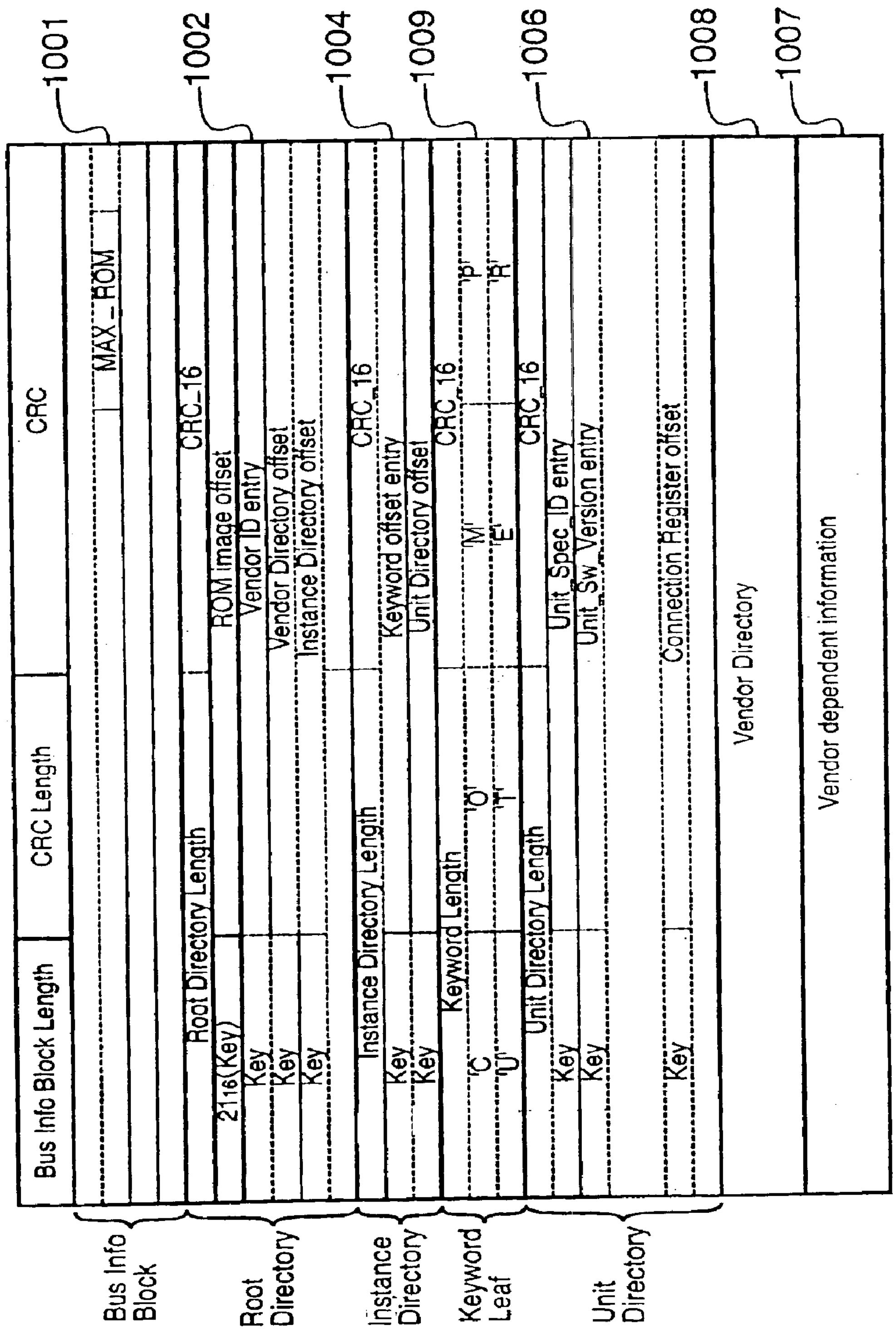
FIG. 30 is a view showing the configuration ROM of the computer according to the embodiment.

A configuration ROM 2803 stores identification information and communication conditions unique to each device. The data format of the configuration ROM complies with the format defined by the IEEE 1212 and IEEE 1394, as described above in the outline of the IEEE 1394. The printer of this embodiment has a configuration ROM with a general format as shown in FIG. 30 (to be described later).

Configuration ROM

Figure 27:
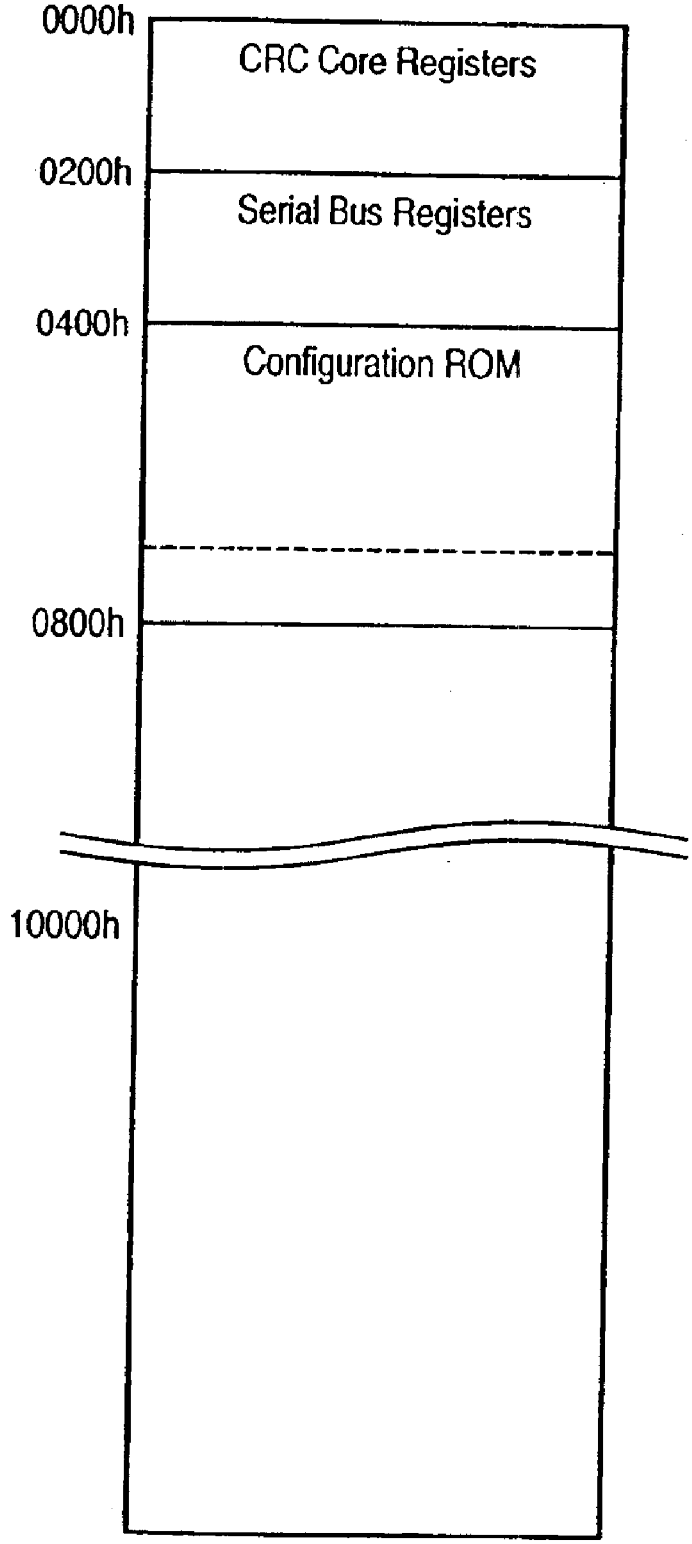
FIG. 27 is a view showing the 1394 address space of the printer according to the embodiment.
Figure 28:
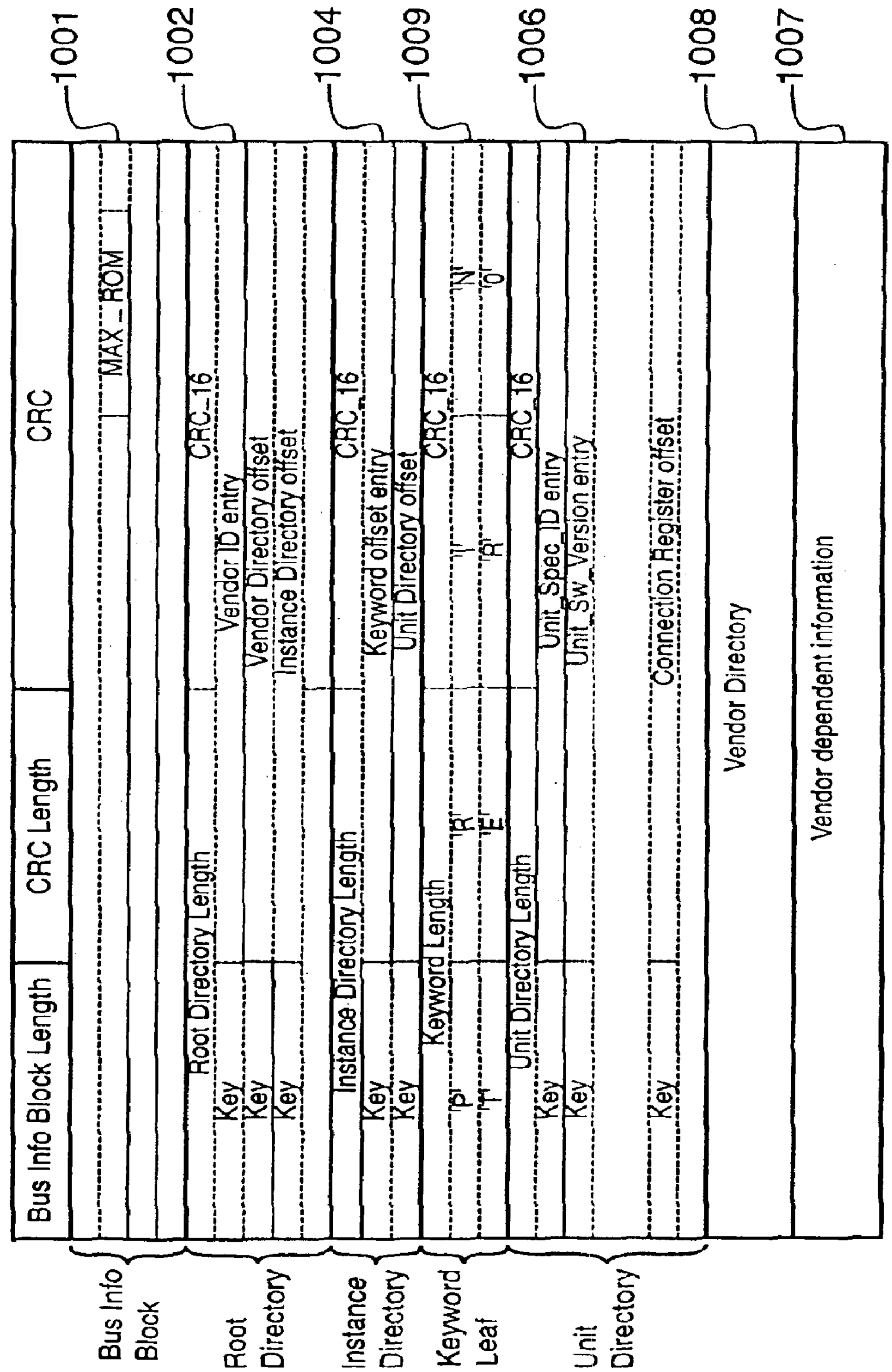
FIG. 28 is a view showing the configuration ROM of the printer according to the embodiment.

The printer of this embodiment has a configuration ROM with a general format as shown in FIG. 28 in an address space (to be referred to as a "1394 address space" hereinafter) on the 1394 interface of the printer shown in FIG. 27.

The basic function of the printer of this embodiment and detailed information attached to the basic function are stored in an instance directory 1004 offset from the root directory 1002. Information of software (protocol) supported by the printer is stored in the unit directory 1006 offset from the root directory 1002.

A vendor directory 1008 capable of storing information of the vendor that has manufactured the device and information unique to the vendor is also offset from the root directory 1002.

Instance Directory

The instance directory 1004 stores information related to the basic function of the device. When the device supports one function (only one instance), one instance directory is prepared. When the device supports a plurality of functions (a plurality of instances), a plurality of instance directories are present.

In each instance directory, function information is described in the form of keyword, and additionally, pointer information to the unit directory which stores software (protocol) information for controlling the function is stored. If detailed information unique to each function is present, pointer information to the function info directory where the information is stored is also stored.

In the printer of this embodiment, a keyword [PRINTER] representing the printer function is described in a keyword leaf 1009 of the instance directory 1004.

Unit Directory

The unit directory 1006 stores information related to a software protocol unit (to be simply referred to as a "protocol" hereinafter) supported by the device. When the device supports only one protocol, one unit directory is prepared. When the device supports a plurality of protocols, a plurality of unit directories are present.

In each unit directory, an ID for discriminating a protocol is described in the form of Unit_Spec_ID or Unit_Sw_Version, and additionally, detailed information unique to each protocol, represented by the offset of the entry point of the protocol, is stored.

In the printer of this embodiment, at least a unit directory in which information related to DPP (Direct Print Protocol) used for data transfer through the 1394 interface is described is present.

Address Space of Printer

As described above in the outline of the IEEE 1394, the final 28 bits of address settings of the 1394 serial bus are ensured as a data area unique to each device and accessible from another device connected to the serial bus.

FIG. 27 is a view showing the 28-bit address space of the printer according to the embodiment. The configuration ROM is allocated in an area from address 400h to 800h, as shown in FIG. 27. A register related to operation unique to the printer is allocated in an area from address 800h. Registers for DPP control are allocated in an area from address 10000h.

The entire address space of the printer of this embodiment can deal with a quadlet transaction as the minimum unit transaction in the IEEE 1394 data transfer to a block transaction up to 512 quadlets (2,048 bytes). The address space can also cope with a block read request up to 256 quadlets for a read from the configuration ROM area.

[Computer]

Since the arrangement of a 1394 interface block incorporated in a computer according to this embodiment is the same as that of the printer shown in FIG. 26, and the internal arrangement of the computer is the same as that of a general-purpose computer such as a personal computer, a detailed description thereof will be omitted.

Figure 29:
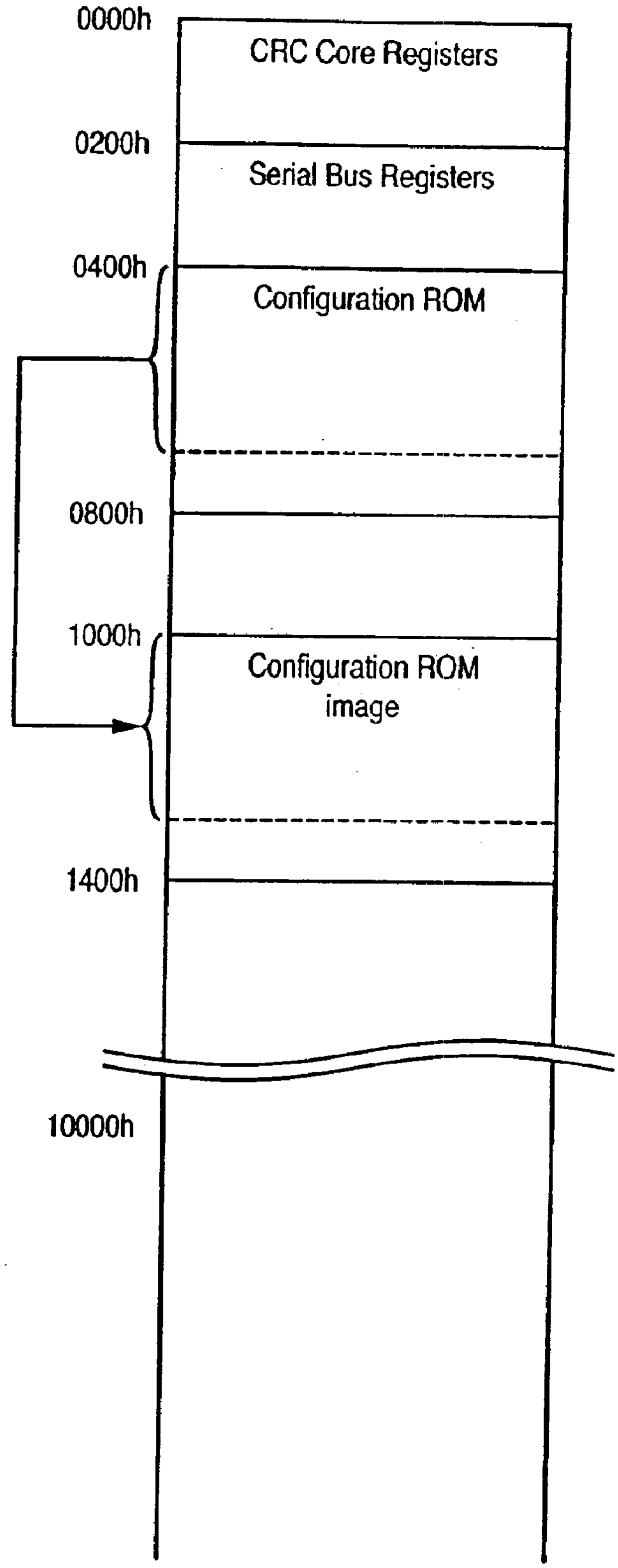
FIG. 29 is a view showing the 1394 address space of a computer according to the embodiment.

The computer of this embodiment has a configuration ROM with a general format as shown in FIG. 30 in the 1394 address space of the computer shown in FIG. 29. In a 1-kbyte area starting from address *FFFFF0001000h of the 1394 address space shown in FIG. 29, copy data identical to data stored in the configuration ROM area is allocated.

The basic types of information described in the configuration ROM are almost the same as in the printer except that a keyword [COMPUTER] representing the basic function is described in the keyword leaf 1009 of the instance directory 1004. In addition, the unit directory 1006 in which information related to the DPP as a protocol related to data transfer is described is present.

As shown in FIG. 29, the configuration ROM is allocated in an area from address 400h to 800h. Unlike the printer, only a quadlet request as a minimum unit transaction in the IEEE 1394 data transfer is supported in an area from address 200h to 800h because of device limitations.

An area from address 800h can deal with a quadlet transaction to a block transaction up to 512 quadlets (2,048 bytes). Data identical to that in the configuration ROM is allocated in an area from address 1000h to 1400h, thereby compensating for the limitation in data transfer.

In association with this arrangement, an entry containing an offset value (ROM image offset) used to refer to the start address of the area where data identical to that in the configuration ROM is allocated is placed at the start entry of the root directory 1002 of the configuration ROM together with a key value [21h] predetermined to identify the information.

[Digital Camera]

Since the arrangement of a 1394 interface block incorporated in a digital camera according to this embodiment is the same as that of the printer shown in FIG. 26, and the internal arrangement of the digital camera is the same as that of a general-purpose digital camera, a detailed description thereof will be omitted.

Figure 31:
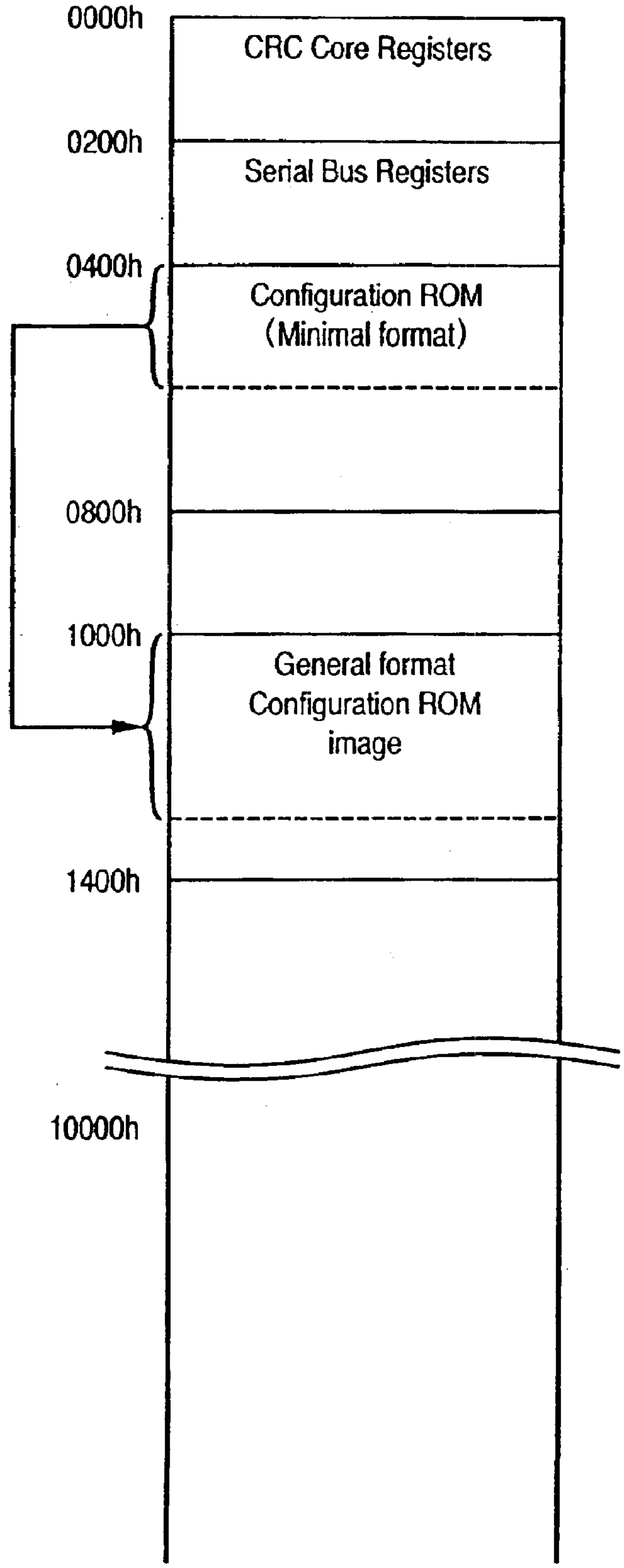
FIG. 31 is a view showing the 1394 address space of a digital camera according to the embodiment.

The digital camera of this embodiment has a configuration ROM with a minimal format as shown in FIG. 32 in the 1394 address space of the digital camera shown in FIG. 31. In a 1-kbyte area started from address *FFFFF0001000h of the 1394 address space shown in FIG. 31, data corresponding to a configuration ROM with a general format is allocated.

As shown in FIG. 31, the configuration ROM is allocated in an area from address 400h to 800h. As in the computer, only a quadlet request as a minimum unit transaction in the IEEE 1394 data transfer is supported in an area from address 200h to 800h because of device limitations.

An area from address 800h can deal with a quadlet transaction to a block transaction up to 512 quadlets (2,048 bytes). Data corresponding to a configuration ROM with a general format is allocated in an area from address 1000h to 1400h, thereby compensating for the limitation in data transfer.

In association with this arrangement, an entry containing an offset value (ROM image offset) used to refer to the start address of the area where data corresponding to a configuration ROM with a general format is allocated is placed next to the entry with a key value "1h" and Vendor_ID in the configuration ROM with the minimal format together with a vendor-unique key value [38h] predetermined to identify the information.

The data starting from address 1000h complies with the format of a configuration ROM with a general format. A keyword [CAMERA] representing the basic function is described in the keyword leaf 1009 of the instance directory 1004. In addition, the unit directory 1006 in which information related to the DPP as a protocol used for data transfer is described is present.

The above computer, digital camera, and inkjet printer are devices connected to each other by a 1394 network.

[Device Discovery Operation]

A configuration ROM read to be executed between the devices for device discovery in the state wherein the devices are connected to the 1394 network will be described.

Detection of Printer

Figure 33:
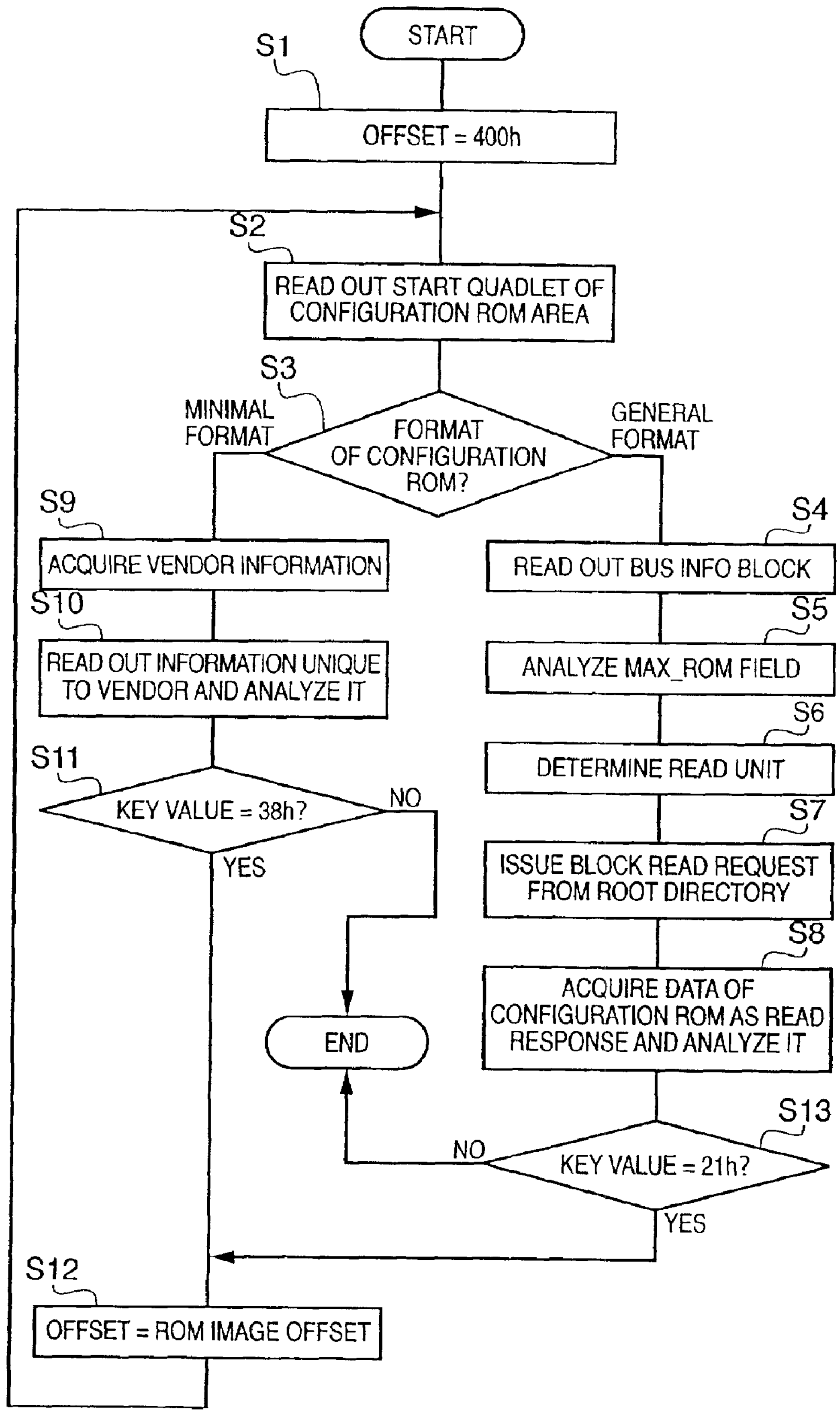
FIG. 33 is a flow chart for explaining device discovery operation.

Operation of causing the computer to detect the printer connected to the 1394 network will be described first with reference to the flow chart shown in FIG. 33.

When the computer of this embodiment is powered on (or reset) to activate bus reset, and the bus reset is then canceled, the operating system (OS) of the computer reads the configuration ROMs of all devices connected to the 1394 network.

First, the computer reads out information from the configuration ROM of node #1 (printer). The offset is set to 400h (S1), the start quadlet is read out from the configuration ROM area of node #1 (S2), and the most significant byte is analyzed to determine the format of the configuration ROM (S3).

Since the printer of this embodiment has a configuration ROM with a general format, the bus info block 1001 corresponding to four quadlets is read out from address 404h (S4). Next, the MAX_ROM field (FIG. 28) of the bus info block is analyzed (5S). This analysis reveals that the configuration ROM area of node #1, i.e., printer can cope with a transaction with an arbitrary block size up to 256 quadlets.

The configuration ROM read unit is determined to 16 quadlets (64 bytes) as the maximum capability of the computer (S6), and a block read request from the root directory 1002 (address 414h) is issued (S7). Upon receiving the block read request, node #1 issues an ACK to the request and then returns block data at the requested address to the requesting node, i.e., computer as a read response.

In this way, the computer repeatedly issues a block read request for 16 quadlets from address 414h, acquires the data in the configuration ROM as a read response, and analyzes the data (S8). Hence, each directory such as the root directory is read on the basis of its directory length (e.g., the root directory length), and each entry contained in the directory is analyzed on the basis of a key value. If necessary, issue of a block read request is further repeated, thereby acquiring the vendor information, function information, and protocol information of node #1.

In steps S7 and S8, the read and analysis of the configuration ROM are repeated, and the computer recognizes that node #1 is a printer that supports the DPP on the basis of the information stored in the instance directory 1004 and unit directory 1006 of the configuration ROM of node #1.

Detection of Digital Camera

Operation of causing the computer to detect the digital camera connected to the 1394 network will be described next with reference to the flow chart shown in FIG. 33.

The computer reads out the start quadlet from the configuration ROM area of node #2 (digital camera) (S2), and analyzes the most significant byte to determine the format of the configuration ROM (S3).

As described above, since the digital camera of this embodiment has a configuration ROM with a minimal format, the value of the most significant byte of the start quadlet is "1h" representing the minimal format, as shown in FIG. 32. Hence, the computer recognizes the minimal format and then analyzes the following three bytes to acquire vendor information (S9). Subsequently, the vendor dependent information stored from address 404h is read out and analyzed (S10).

As described above, an entry containing an offset value indicating the start address of the area where data corresponding to a configuration ROM with a general format is allocated is present from address 404h of the digital camera of this embodiment as information unique to the vendor together with a key value [38h] predetermined to identify the information.

The computer detects the key value [38h] (S11) and recognizes that the value of the entry is the offset value (1000h in this case) used to refer to the data corresponding to a configuration ROM with a general format. The offset to set to 1000h (S12), and processing from step S2 is executed.

The quadlet at address 1000h is read out (S2), and it is determined that the data corresponding to a configuration ROM with a general format is allocated from address 1000h (S3). The bus info block corresponding to four quadlets is read out from address 1004h (S4), and the MAX_ROM field is analyzed (S5). This analysis reveals that the area from address 1000h of node #2 where the data corresponding to the configuration ROM is stored can cope with a read request for an arbitrary block size up to 256 quadlets (1,024 bytes).

As in the configuration ROM of the printer, the read unit is determined to 16 quadlets (64 bytes) as the maximum capability of the computer (S6), and a block read request from address 1014h corresponding to the root directory 1002 is issued (S7). Upon receiving the block read request, node #2 issues an ACK to the request and then returns block data at the requested address to the requesting node, i.e., computer as a read response.

In this way, the computer repeatedly issues a block read request for 16 quadlets from address 1014h, acquires the data corresponding to the configuration ROM as a read response, and analyzes the data (S8). Hence, data corresponding to each directory such as the root directory is read on the basis of its directory length (e.g., the root directory length), and each entry contained in the directory is analyzed on the basis of a key value. If necessary, issue of a block read request is further repeated, thereby acquiring the vendor information, function information, and protocol information of node #2.

In steps S7 and S8, the read and analysis of the data corresponding to the configuration ROM are repeated, and the computer recognizes that node #2 is a digital camera that supports the DPP on the basis of the information in the instance directory 1004 and unit directory 1006 corresponding to the configuration ROM of node #2.

As described above, the computer reads out information from the configuration ROM of each device on the 1394 network and analyzes the information to obtain the device information of the node. In this read, however, for some devices (the digital camera in the above description), only information as a configuration ROM with a minimal format is obtained, and no block transaction can be used. To provide more detailed information and increase the efficiency of the configuration ROM read, data (ROM image) corresponding to a configuration ROM with a general format is stored in an area capable of a block transaction. When the ROM image is read by a block transaction, the device discovery can be efficiently performed, and detailed information can be acquired.

Printing Operation

Upon receiving a user instruction for the start of printing operation of the printer on the 1394 network, the computer establishes a signal path in accordance with the detected DPP, which is supported by the printer, on the basis of information from the unit directory 1006 related to the DPP in the configuration ROM of the printer. More specifically, a connect command packet is issued to an address described in connection register information in the unit directory 1006 of the printer. A detailed description of the DPP will be omitted.

Upon receiving the connect command, the printer starts reading the configuration ROM of the node (node #3), that has issued the connect command, to return a response for the connect request. This read operation will be described with reference to FIGS. 33 and 34.

First, the printer reads out information from the configuration ROM of node #3. The offset is set to 400h (S1), the start quadlet is read out from the configuration ROM area of node #3 (S2), and the most significant byte is analyzed to determine the format of the configuration ROM (S3).

Since the computer of this embodiment has a configuration ROM with a general format, the printer reads out the bus info block 1001 corresponding to four quadlets from address 404h (S4). The above processing corresponds to step S101 shown in FIG. 34.

Next, the MAX_ROM field of the bus info block is analyzed (S5). In the computer of this embodiment, an area from address 200h to 800h supports only a quadlet read as the minimum unit transaction. For this reason, a value indicating that the area copes with only a quadlet read is described in the MAX_ROM field.

In accordance with these pieces of information, the printer determines the configuration ROM read unit to the minimum unit, i.e., 1 quadlet (4 bytes) (S6), issues a block read request from the root directory 1002 (address 414h) (S7), acquires data in the configuration ROM as a read response, and analyzes the data (S8). The above processing corresponds to step S102 shown in FIG. 34.

As described above, an entry containing an offset value indicating the start address of the area where data identical to that in the configuration ROM is allocated is present in the root directory of the configuration ROM of the computer of this embodiment together with a key value [21h] predetermined to identify the information.

The printer detects the key value [21h] (S13) and recognizes that the value of the entry is the offset value (1000h in this case) used to refer to the data identical to the configuration ROM. The offset to set to 1000h (S12), and processing from step S2 is executed.

The quadlet at address 1000h is read out (S2), and it is determined that data identical to the configuration ROM is allocated from address 1000h (S3). The bus info block corresponding to four quadlets is read out from address 1004h (S4), and the MAX_ROM field is analyzed (S5). The above processing corresponds to step S103 shown in FIG. 34.

The analysis in step S5 reveals that the area from address 1000h of node #3 where the data identical to the configuration ROM is stored can cope with a read request for an arbitrary block size up to 256 quadlets (1,024 bytes). Although the maximum access size of this area is actually 2,048 bytes (512 quadlets), the maximum access size of the ROM area is 1,024 bytes.

Hence, the printer determines the read unit to 256 quadlets (1,024 bytes) as the maximum capability of the printer (S6) and issues a block read request from address 1014h corresponding to the root directory 1002 (S7). Upon receiving the block read request, node #3 issues an ACK to the request and then returns block data at the requested address to the requesting node, i.e., printer as a read response.

Figure 34:
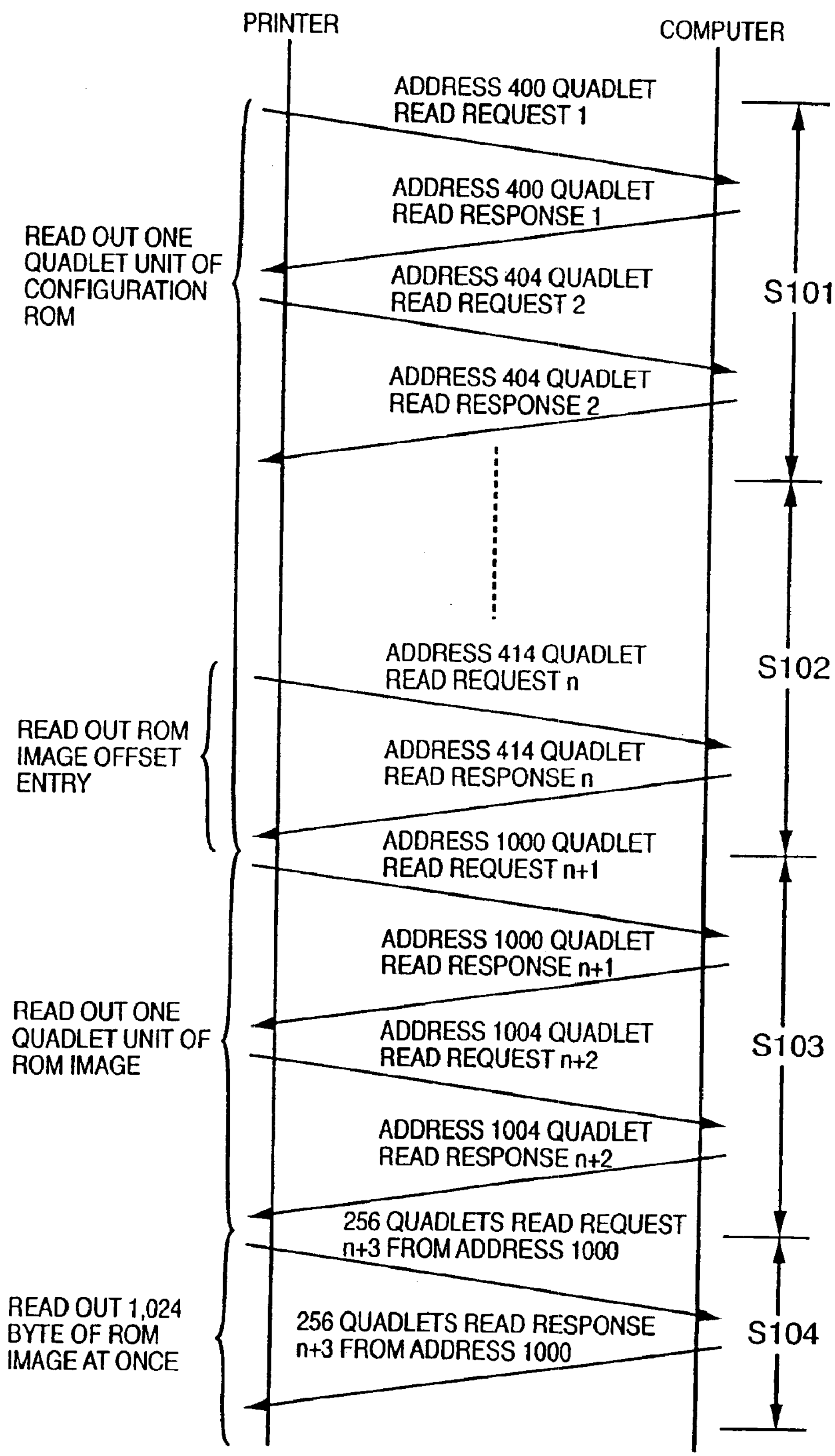
FIG. 34 is a view for explaining the read operation of the configuration ROM of the computer by the printer according to the embodiment.

In this case, the printer can read out and analyze the remaining all data in the configuration ROM by issuing a block read request for 256 quadlets (1,024 bytes) once (S8). All data in the configuration ROM starting from address 1000h may be read out at once, as shown in FIG. 34. The above processing corresponds to step S104 shown in FIG. 34.

With the read and analysis of the data identical to the configuration ROM, the printer can recognize that node #3 is a computer that supports the DPP on the basis of the information in the instance directory 1004 and unit directory 1006 identical to the configuration ROM of node #3 and also obtain address information in the connection register of the computer to which a response to the connect request of the DPP should be returned.

As described above, the printer reads out information from the configuration ROM of a node on the 1394 network and analyzes the information to obtain the device information of the node. In this read, however, for some devices (the computer in the above description), no block transaction can be used. To increase the efficiency of the configuration ROM read, data (ROM image) identical to the configuration ROM is stored in an area capable of a block transaction. When the ROM image is read by a block transaction, the device discovery can be efficiently performed.

As has been described above, in an electronic device complying with the IEEE 1394, the configuration ROM storage area defined by the IEEE 1212 sometimes supports only a quadlet read transaction or does not support a block read transaction with a large block size. In such a case, data identical to information stored in the configuration ROM area or data corresponding to a configuration ROM with a general format is stored as a ROM image in an area with a higher data read efficiency, i.e., an area that supports a block read transaction with a large block size. By an efficient data access of a 1394 serial bus, information in the configuration ROM of a device can be efficiently read out.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus comprising:

an interface arranged to connect to a serial bus compatible to or complying with the IEEE 1394 standard; and a memory arranged to store, in a predetermined first address area, configuration ROM information complying with the IEEE 1212 standard, and to store configuration information identical to the configuration ROM information in a second address area different from the predetermined first address area, wherein information stored in the predetermined first address area can be read out by a first type of reading operation but cannot be read out by a second type of reading operation, information stored in the second address area can be read out by the second type of reading operation, and a readable data size of the second type of reading operation is larger than that of the first type of reading operation.

2. The apparatus according to claim 1, wherein the configuration ROM information contains information used to refer to the second address area where the configuration information is stored.

3. The apparatus according to claim 1, wherein the configuration ROM information has a general format defined in the IEEE 1212 standard, and a first entry in a root directory of the configuration ROM information contains information used to refer to the second address area where the configuration information is stored.

4. The apparatus according to claim 1, wherein the second address area where the configuration information is to be stored is an area where a block read transaction with a large block size is supported.

5. An information processing apparatus comprising:

an interface arranged to connect to a serial bus compatible to or complying with the IEEE 1394 standard; and a memory arranged to store, in a predetermined first address area, configuration ROM information with a minimal format complying with the IEEE 1212 standard, and to store configuration information corresponding to the configuration ROM information with a general format complying with the IEEE 1212 standard in a second address area different from the predetermined first address area, wherein information stored in the predetermined first address area can be read out by a first type of reading operation but cannot be read out by a second type of reading operation, information stored in the second address area can be read out by the second type of reading operation, and a readable data size of the second type of reading operation is larger than that of the first type of reading operation.

6. The apparatus according to claim 5, wherein the configuration ROM information with the minimal format contains information used to refer to the second address area where the configuration information is stored.

7. The apparatus according to claim 5, wherein the second address area where the configuration information is to be stored is an area where a block read transaction with a large block size is supported.

8. An information processing method of processing information between a plurality of devices connected to a serial bus compatible to or complying with the IEEE 1394 standard, comprising the steps of:

reading out at least part of configuration ROM information complying with the IEEE 1212 standard, which is stored in a predetermined first address area of a device; and reading out configuration information identical to the configuration ROM information, which is stored in a second address area different from the predetermined first address area, on the basis of the readout information, wherein information stored in the predetermined first address area can be read out by a first type of reading operation but cannot be read out by a second type of reading operation, information stored in the second address area can be read out by the second type of reading operation, and a readable data size of the second type of reading operation is larger than that of the first type of reading operation.

9. The method according to claim 8, wherein the configuration ROM information contains information used to refer to the second address area where the configuration information is stored.

10. The method according to claim 8, wherein the configuration ROM information has a general format defined in the IEEE 1212 standard, and a first entry in a root directory of the configuration ROM information contains information used to refer to the second address area where the configuration information is stored.

11. The method according to claim 8, wherein the second address area where the configuration information is to be stored is an area where a block read transaction with a large block size is supported.

12. An information processing method of processing information between a plurality of devices connected to a serial bus compatible to or complying with the IEEE 1394 standard, comprising the steps of:

reading out at least part of configuration ROM information with a minimal format complying with the IEEE 1212 standard, which is stored in a predetermined first address area of a device; and reading out configuration information corresponding to the configuration ROM information with a general format according to the IEEE 1212 format, which is stored in a second address area different from the predetermined first address area, on the basis of the readout information, wherein information stored in the predetermined first address area can be read out by a first type of reading operation but cannot be read out by a second type of reading operation, information stored in the second address area can be read out by the second type of reading operation, and a readable data size of the second type of reading operation is larger than that of the first type of reading operation.

13. The method according to claim 12, wherein the configuration ROM information contains information used to refer to the second address area where the configuration information is stored.

14. The method according to claim 12, wherein the second address area where the configuration information is to be stored is an area where a block read transaction with a large block size is supported.

15. A computer program product stored on a computer readable medium comprising a computer program code, for an information processing method of processing information between a plurality of devices connected to a serial bus compatible to or complying with the IEEE 1394 standard, comprising process procedure code for;

reading out at least part of configuration ROM information complying with the IEEE 1212 standard, which is stored in a predetermined first address area of a device; and reading out configuration information identical to the configuration ROM information, which is stored in a second address area different from the predetermined first address area, on the basis of the readout information, wherein information stored in the predetermined first address area can be read out by a first type of reading operation but cannot be read out by a second type of reading operation, information stored in the second address area can be read out by the second type of reading operation, and a readable data size of the second type of reading operation is larger than that of the first type of reading operation.

16. A computer program product stored on a computer readable medium comprising a computer program code, for an information processing method of processing information between a plurality of devices connected to a serial bus compatible to or complying with the IEEE 1394 standard, comprising process procedure code for:

reading out at least part of configuration ROM information with a minimal format complying with the IEEE 1212 standard, which is stored in a predetermined first address area of a device; and reading out configuration information corresponding to the configuration ROM information with a general format complying with the IEEE 1212 format, which is stored in a second address area different from the predetermined first address area, on the basis of the readout information.

wherein information stored in the predetermined first address area can be read out by a first type of reading operation but cannot be read out by a second type of reading operation, information stored in the second address area can be read out by the second type of reading operation, and a readable data size of the second type of reading operation is larger than that of the first type of reading operation.

* * * * *